US012659897B2

(12) United States Patent
Yuan et al.

(10) Patent No.: US 12,659,897 B2
(45) Date of Patent: Jun. 16, 2026

(54) PANEL-SPECIFIC TIMING OFFSETS FOR MULTI-PANEL ANTENNA UPLINK TRANSMISSIONS

(71) Applicant: QUALCOMM Incorporated, San Diego, CA (US)

(72) Inventors: Fang Yuan, Beijing (CN); Wooseok Nam, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 506 days.

(21) Appl. No.: 17/923,578

(22) PCT Filed: May 20, 2020

(86) PCT No.: PCT/CN2020/091362
§ 371 (c)(1),
(2) Date: Nov. 5, 2022

(87) PCT Pub. No.: WO2021/232304
PCT Pub. Date: Nov. 25, 2021

(65) Prior Publication Data
US 2023/0189180 A1 Jun. 15, 2023

(51) Int. Cl.
*H04W 56/00* (2009.01)

(52) U.S. Cl.
CPC .............................. *H04W 56/0045* (2013.01)

(58) Field of Classification Search
CPC .................................................. H04W 56/0045
See application file for complete search history.

(56) References Cited

U.S. PATENT DOCUMENTS 10,153,871 B2 * 12/2018 Dinan ................... H04L 5/0007
10,568,041 B2 * 2/2020 MolavianJazi ..... H04W 52/146
(Continued)

FOREIGN PATENT DOCUMENTS

CN 108811075 A 11/2018
CN 110868231 A 3/2020
(Continued)

OTHER PUBLICATIONS

Supplementary Partial European Search Report—EP20936421—Search Authority—The Hague—Jan. 29, 2024.
(Continued)

*Primary Examiner* — Wutchung Chu
*Assistant Examiner* — Berhanu D Belete
(74) *Attorney, Agent, or Firm* — Loza & Loza, LLP

(57) ABSTRACT

A user equipment for wireless communication is provided. The user equipment receives configuration information for a serving cell. The configuration information indicates at least one bandwidth part and at least two timing advance group identifiers for the serving cell. The user equipment determines whether the at least one bandwidth part is configured to support uplink transmissions from a plurality of antenna panels of the user equipment. The user equipment performs a first uplink transmission from a first antenna panel of the plurality of antenna panels based on a first timing advance group identifier and a second uplink transmission from a second antenna panel of the plurality of antenna panels based on a second timing advance group identifier when the at least one bandwidth part is configured to support the uplink transmissions from the plurality of antenna panels.

23 Claims, 18 Drawing Sheets

(56) References Cited

U.S. PATENT DOCUMENTS

| | | | | |
|---|---|---|---|---|
| 10,660,044 | B2 * | 5/2020 | MolavianJazi | H04W 52/146 |
| 11,528,750 | B2 * | 12/2022 | Xu | H04W 72/0453 |
| 11,540,256 | B2 * | 12/2022 | Islam | H04W 72/0453 |
| 12,133,263 | B2 * | 10/2024 | Xiong | H04W 74/0833 |
| 12,267,857 | B2 * | 4/2025 | Park | H04W 72/53 |
| 2013/0258959 | A1 * | 10/2013 | Dinan | H04W 74/0833 370/329 |
| 2015/0085839 | A1 | 3/2015 | Bergstrom et al. | |
| 2016/0112975 | A1 * | 4/2016 | Dinan | H04L 5/0085 370/350 |
| 2016/0323070 | A1 | 11/2016 | Chen et al. | |
| 2017/0079028 | A1 * | 3/2017 | Dinan | H04L 5/008 |
| 2018/0242368 | A1 * | 8/2018 | Dinan | H04W 36/0072 |
| 2018/0359064 | A1 * | 12/2018 | Kim | H04W 56/0045 |
| 2019/0053193 | A1 * | 2/2019 | Park | H04W 74/004 |
| 2019/0116008 | A1 * | 4/2019 | Dinan | H04L 5/0092 |
| 2019/0159135 | A1 * | 5/2019 | MolavianJazi | H04W 52/146 |
| 2019/0159136 | A1 * | 5/2019 | MolavianJazi | H04W 52/146 |
| 2019/0215048 | A1 | 7/2019 | Cirik et al. | |
| 2019/0356461 | A1 * | 11/2019 | Lei | H04L 5/0094 |
| 2020/0008239 | A1 | 1/2020 | Li et al. | |
| 2020/0053657 | A1 * | 2/2020 | MolavianJazi | H04W 52/146 |
| 2020/0053710 | A1 * | 2/2020 | MolavianJazi | H04W 52/146 |
| 2020/0053724 | A1 * | 2/2020 | MolavianJazi | H04W 52/146 |
| 2020/0053752 | A1 | 2/2020 | Huang et al. | |
| 2020/0067664 | A1 * | 2/2020 | Kim | H04W 56/0045 |
| 2020/0099479 | A1 * | 3/2020 | Park | H04W 4/70 |
| 2020/0100154 | A1 * | 3/2020 | Cirik | H04B 7/06964 |
| 2020/0146059 | A1 * | 5/2020 | Cirik | H04L 5/001 |
| 2020/0187236 | A1 * | 6/2020 | Moon | H04L 1/00 |
| 2020/0221504 | A1 * | 7/2020 | Cirik | H04L 1/1864 |
| 2020/0260391 | A1 * | 8/2020 | Zhou | H04W 52/281 |
| 2020/0260445 | A1 * | 8/2020 | Jeong | H04W 72/23 |
| 2020/0275398 | A1 * | 8/2020 | Da | H04L 5/0048 |
| 2020/0314812 | A1 * | 10/2020 | Xu | H04W 52/40 |
| 2020/0389922 | A1 * | 12/2020 | Xu | H04L 5/0053 |
| 2021/0144747 | A1 * | 5/2021 | Moon | H04L 5/0042 |
| 2021/0235397 | A1 * | 7/2021 | Zhang | H04W 56/0045 |
| 2021/0314953 | A1 * | 10/2021 | Park | H04W 80/02 |
| 2021/0321355 | A1 * | 10/2021 | Gao | H04W 56/0045 |
| 2024/0137960 | A1 * | 4/2024 | Park | H04L 5/0091 |
| 2024/0237042 | A9 * | 7/2024 | Park | H04W 80/02 |
| 2025/0212238 | A1 * | 6/2025 | Park | H04W 72/53 |

FOREIGN PATENT DOCUMENTS

| | | |
|---|---|---|
| CN | 111149388 A | 5/2020 |
| EP | 3820050 A1 | 5/2021 |
| WO | 2012126355 A1 | 9/2012 |
| WO | 2019032997 A1 | 2/2019 |
| WO | 2019215505 A1 | 11/2019 |
| WO | 2020030010 A1 | 2/2020 |
| WO | 2020037207 A1 | 2/2020 |

OTHER PUBLICATIONS

Intel Corporation: "Discussion on Beam Management", 3GPP TSG-RAN WG1 Meeting #90bis, R1-1717368, 3rd Generation Partnership Project, Mobile Competence Centre, 650, Route Des Lucioles, F-06921 Sophia-Antipolis Cedex, France, vol. RAN WG1, No. Prague, Czech, Oct. 9, 2017-Oct. 13, 2017, Oct. 8, 2017, pp. 1-7, XP051340558, Paragraph [06.1].

Supplementary European Search Report—EP20936421—Search Authority—The Hague—Jun. 10, 2024.

Huawei., et al., "Correction on Initial BWP in TS 38.213", R1-1907501, 3GPP TSG RAN WG1 Meeting #97, Reno, USA, May 13-17, 2019, May 17, 2019, 5 Pages.

International Search Report and Written Opinion—PCT/CN2020/091362—ISA/CN—Feb. 22, 2021.

* cited by examiner

Apply panel-specific timing offsets to multi-panel antenna uplink transmissions

Frequency

402B

BWP_1

404B

BWP_2

406

BWP_3

404A

BWP_2

402A

BWP_1

Time 408   410   412   414   416

400

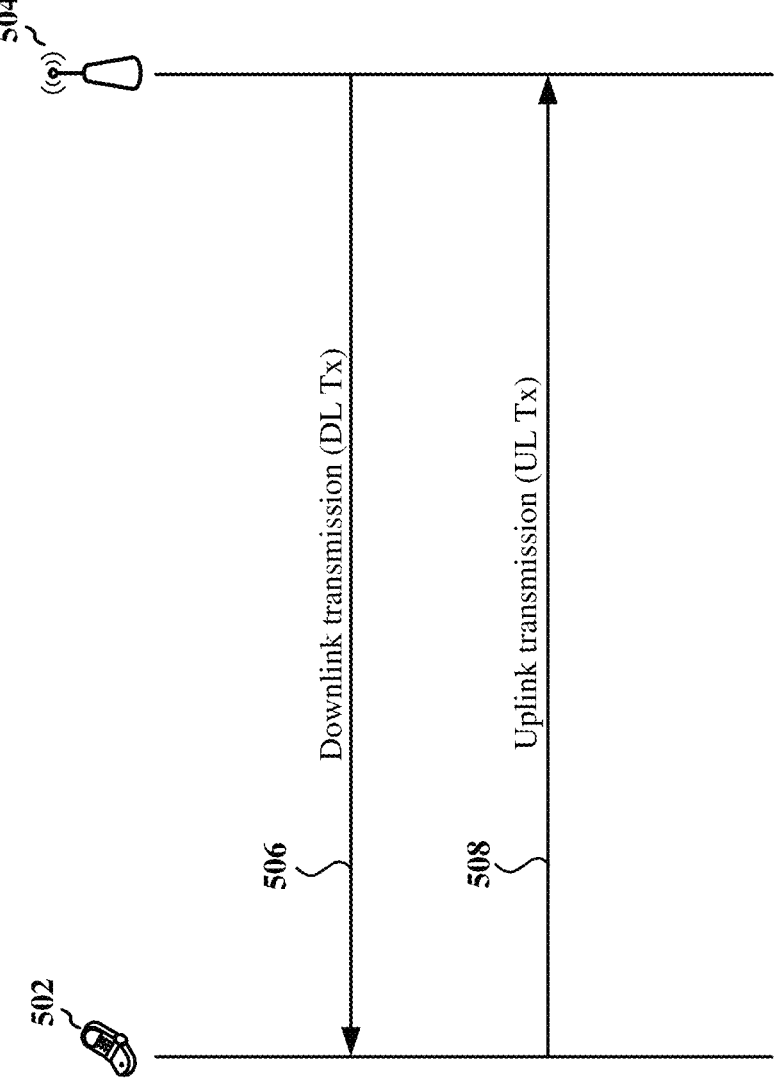
FIG. 5

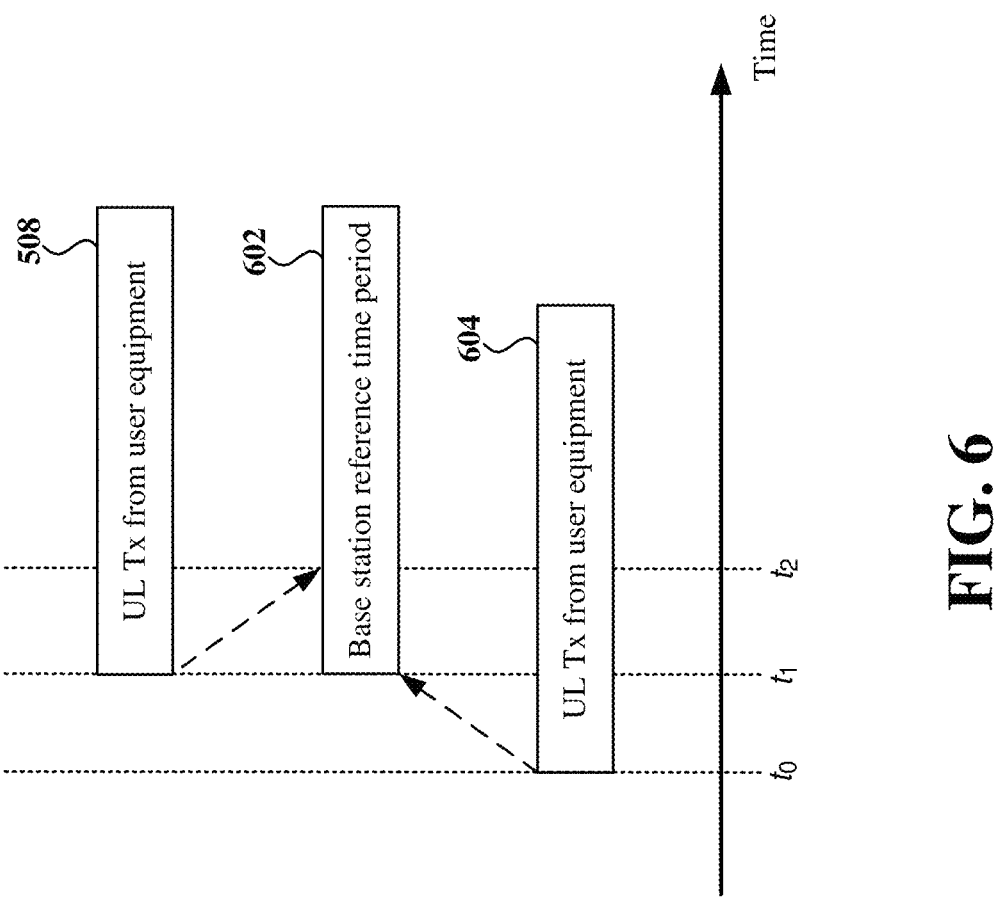
FIG. 6

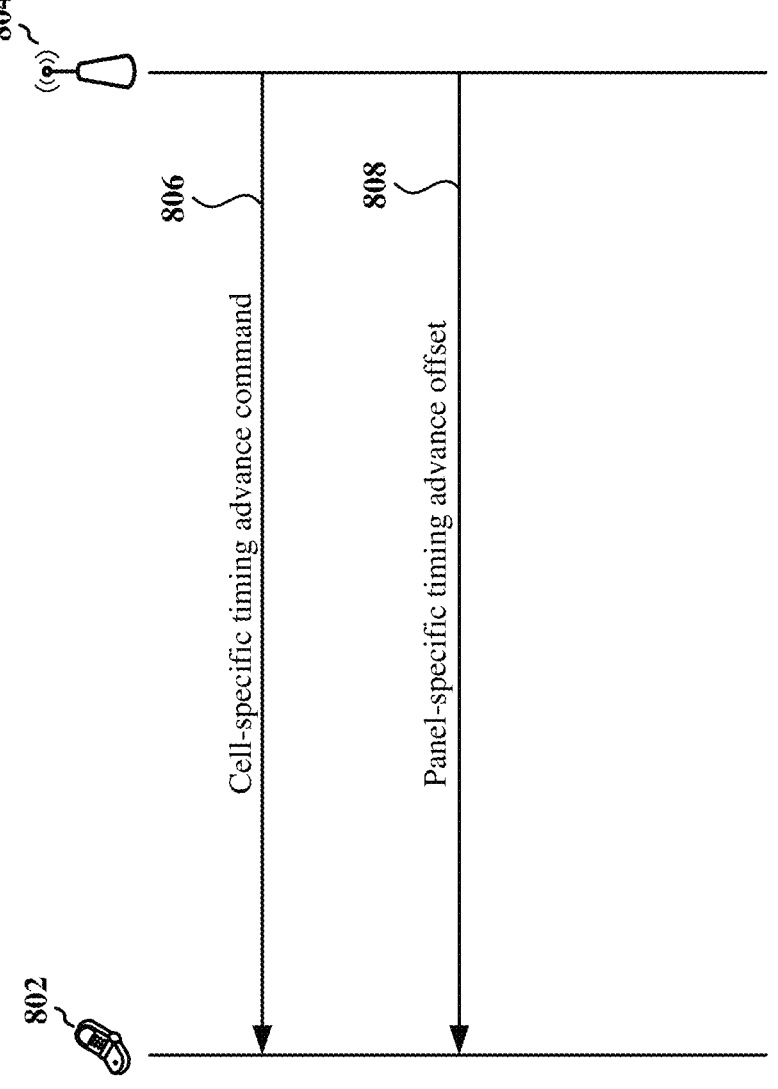
FIG. 8

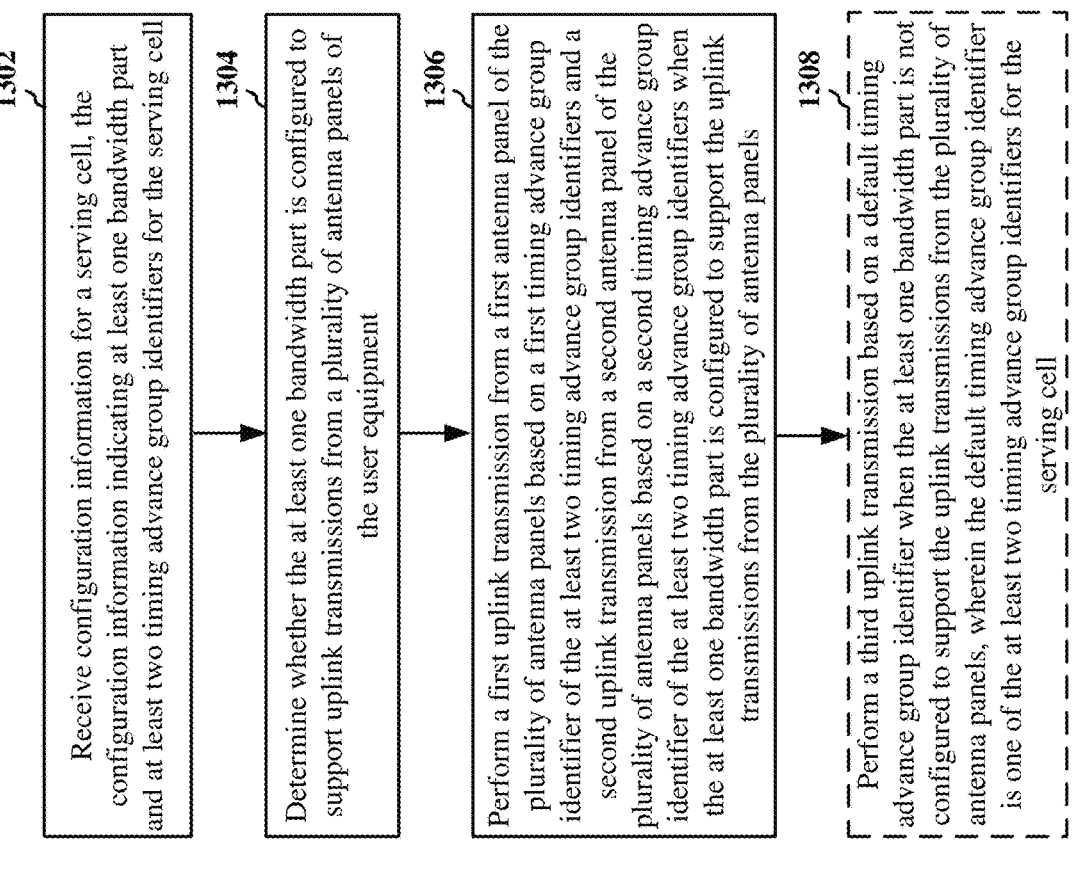

1302

Receive configuration information for a serving cell, the configuration information indicating at least one bandwidth part and at least two timing advance group identifiers for the serving cell

1304

Determine whether the at least one bandwidth part is configured to support uplink transmissions from a plurality of antenna panels of the user equipment

1306

Perform a first uplink transmission from a first antenna panel of the plurality of antenna panels based on a first timing advance group identifier of the at least two timing advance group identifiers and a second uplink transmission from a second antenna panel of the plurality of antenna panels based on a second timing advance group identifier of the at least two timing advance group identifiers when the at least one bandwidth part is configured to support the uplink transmissions from the plurality of antenna panels

1308

Perform a third uplink transmission based on a default timing advance group identifier when the at least one bandwidth part is not configured to support the uplink transmissions from the plurality of antenna panels, wherein the default timing advance group identifier is one of the at least two timing advance group identifiers for the serving cell

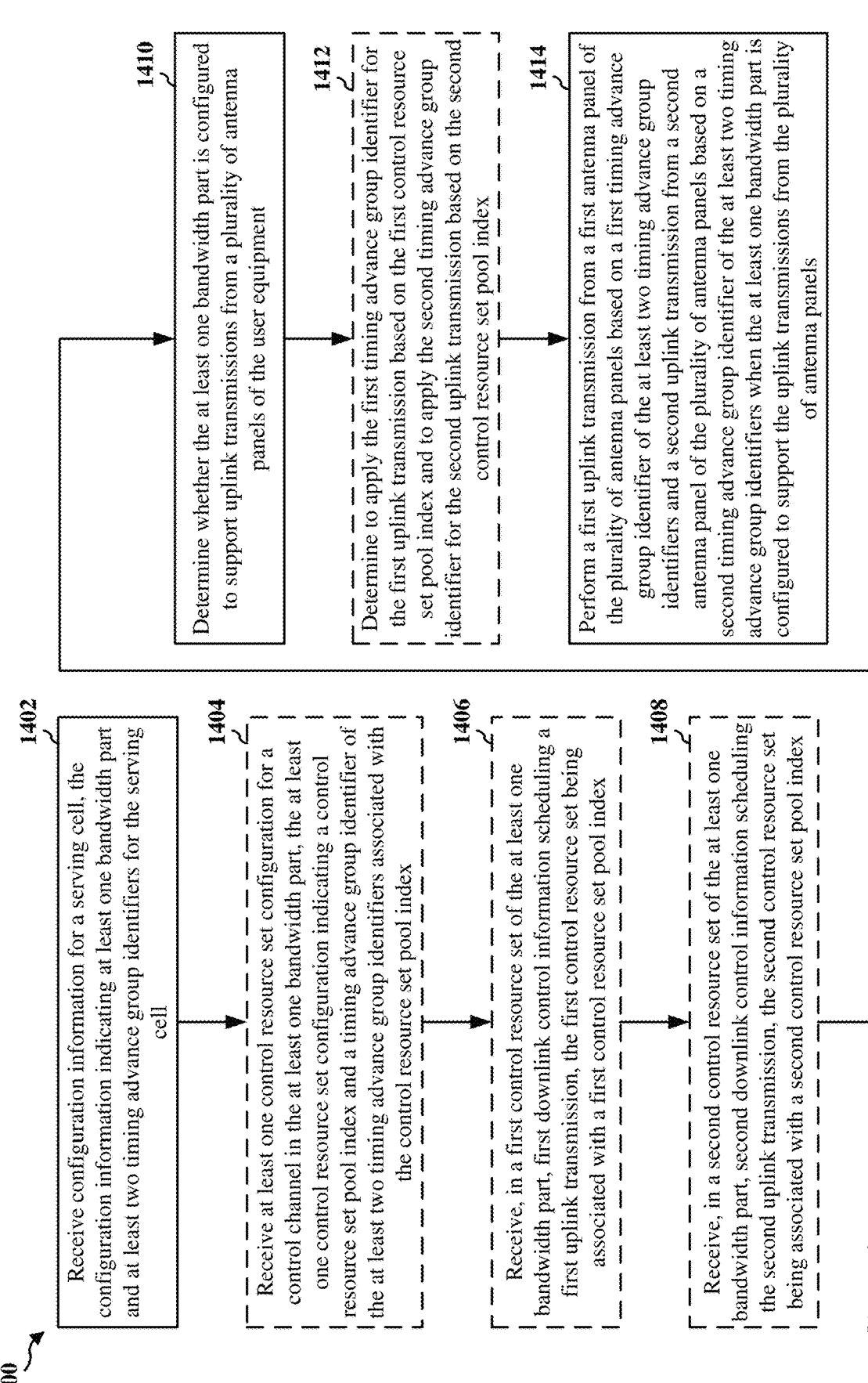

1400

1402 Receive configuration information for a serving cell, the configuration information indicating at least one bandwidth part and at least two timing advance group identifiers for the serving cell 1404 Receive at least one control resource set configuration for a control channel in the at least one bandwidth part, the at least one control resource set configuration indicating a control resource set pool index and a timing advance group identifier of the at least two timing advance group identifiers associated with the control resource set pool index 1406 Receive, in a first control resource set of the at least one bandwidth part, first downlink control information scheduling a first uplink transmission, the first control resource set being associated with a first control resource set pool index 1408 Receive, in a second control resource set of the at least one bandwidth part, second downlink control information scheduling the second uplink transmission, the second control resource set being associated with a second control resource set pool index 1410 Determine whether the at least one bandwidth part is configured to support uplink transmissions from a plurality of antenna panels of the user equipment 1412 Determine to apply the first timing advance group identifier for the first uplink transmission based on the first control resource set pool index and to apply the second timing advance group identifier for the second uplink transmission based on the second control resource set pool index 1414 Perform a first uplink transmission from a first antenna panel of the plurality of antenna panels based on a first timing advance group identifier of the at least two timing advance group identifiers and a second uplink transmission from a second antenna panel of the plurality of antenna panels based on a second timing advance group identifier of the at least two timing advance group identifiers when the at least one bandwidth part is configured to support the uplink transmissions from the plurality of antenna panels

FIG. 14

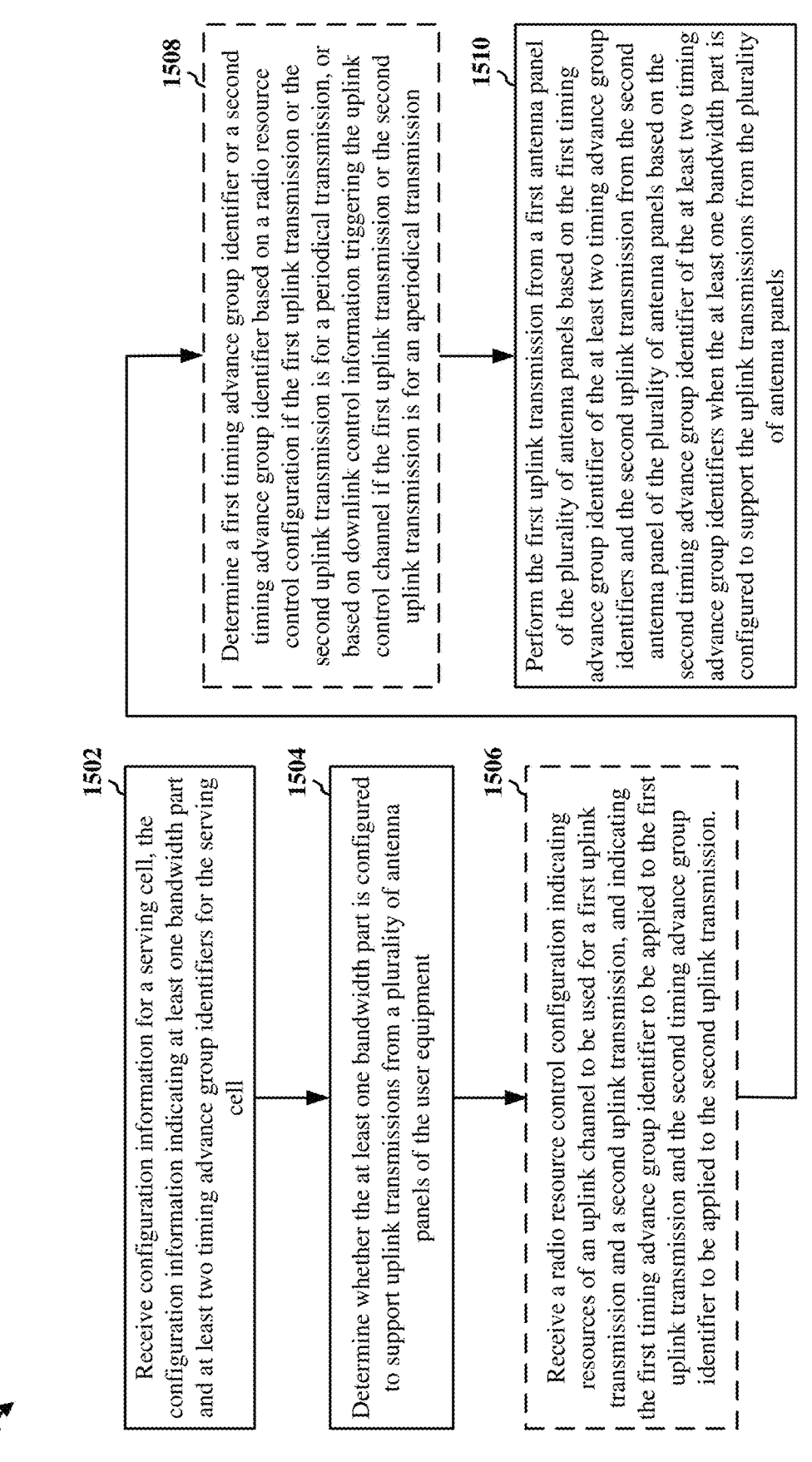

1500

1502

Receive configuration information for a serving cell, the configuration information indicating at least one bandwidth part and at least two timing advance group identifiers for the serving cell

1504

Determine whether the at least one bandwidth part is configured to support uplink transmissions from a plurality of antenna panels of the user equipment

1506

Receive a radio resource control configuration indicating resources of an uplink channel to be used for a first uplink transmission and a second uplink transmission, and indicating the first timing advance group identifier to be applied to the first uplink transmission and the second timing advance group identifier to be applied to the second uplink transmission.

1508

Determine a first timing advance group identifier or a second timing advance group identifier based on a radio resource control configuration if the first uplink transmission or the second uplink transmission is for a periodical transmission, or based on downlink control information triggering the uplink control channel if the first uplink transmission or the second uplink transmission is for an aperiodical transmission

1510

Perform the first uplink transmission from a first antenna panel of the plurality of antenna panels based on the first timing advance group identifier of the at least two timing advance group identifiers and the second uplink transmission from the second antenna panel of the plurality of antenna panels based on the second timing advance group identifier of the at least two timing advance group identifiers when the at least one bandwidth part is configured to support the uplink transmissions from the plurality of antenna panels

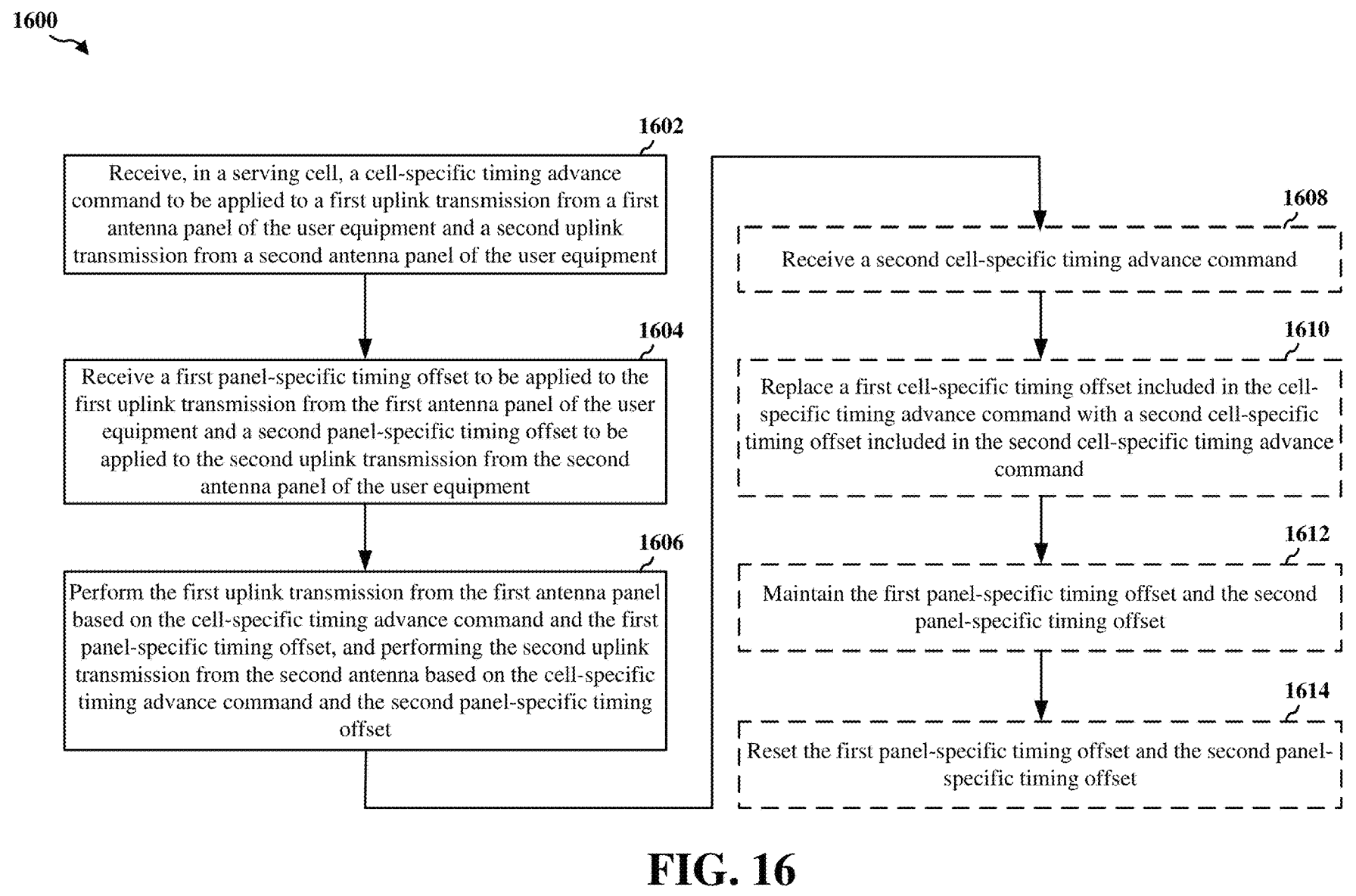

Receive, in a serving cell, a cell-specific timing advance command to be applied to a first uplink transmission from a first antenna panel of the user equipment and a second uplink transmission from a second antenna panel of the user equipment

1604

Receive a first panel-specific timing offset to be applied to the first uplink transmission from the first antenna panel of the user equipment and a second panel-specific timing offset to be applied to the second uplink transmission from the second antenna panel of the user equipment

1606

Perform the first uplink transmission from the first antenna panel based on the cell-specific timing advance command and the first panel-specific timing offset, and performing the second uplink transmission from the second antenna based on the cell-specific timing advance command and the second panel-specific timing offset

1608

Receive a second cell-specific timing advance command

1610

Replace a first cell-specific timing advance command with a second cell-specific timing offset included in the second cell-specific timing advance command

1612

Maintain the first panel-specific timing offset and the second panel-specific timing offset

1614

Reset the first panel-specific timing offset and the second panel-specific timing offset

FIG. 16

PANEL-SPECIFIC TIMING OFFSETS FOR MULTI-PANEL ANTENNA UPLINK TRANSMISSIONS

CROSS-REFERENCE TO RELATED APPLICATION(S)

This application is the U.S. national stage of PCT patent application number PCT/CN2020/091362 filed on May 20, 2020.

BACKGROUND

Technical Field

The present disclosure relates generally to communication systems, and more particularly, to the application of panel-specific timing offsets for multi-panel antenna uplink transmissions.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives configuration information for a serving cell, the configuration information indicating at least one bandwidth part and at least two timing advance group identifiers for the serving cell. The apparatus determines whether the at least one bandwidth part is configured to support uplink transmissions from a plurality of antenna panels of the user equipment. The apparatus performs a first uplink transmission from a first antenna panel of the plurality of antenna panels based on a first timing advance group identifier of the at least two timing advance group identifiers and a second uplink transmission from a second antenna panel of the plurality of antenna panels based on a second timing advance group identifier of the at least two timing advance group identifiers when the at least one bandwidth part is configured to support the uplink transmissions from the plurality of antenna panels.

In an aspect of the disclosure, a method, a computer-readable medium, and an apparatus are provided. The apparatus receives, in a serving cell, a cell-specific timing advance command to be applied to a first uplink transmission from a first antenna panel of the user equipment and a second uplink transmission from a second antenna panel of the user equipment. The apparatus receives a first panel-specific timing offset to be applied to the first uplink transmission from the first antenna panel of the user equipment and a second panel-specific timing offset to be applied to the second uplink transmission from the second antenna panel of the user equipment. The apparatus performs the first uplink transmission from the first antenna panel based on the cell-specific timing advance command and the first panel-specific timing offset, and performs the second uplink transmission from the second antenna based on the cell-specific timing advance command and the second panel-specific timing offset.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 illustrates a wireless communication network including a user equipment (UE) and a base station.

FIG. 6 illustrates an example of a timing misalignment with reference to the previously described wireless communication network.

FIG. 8 illustrates an example signal flow diagram for indicating a cell-specific timing advance command and a panel-specific timing advance offset to a user equipment (UE) in accordance with various aspects of the present disclosure.

FIG. 13 is a flowchart of a method of wireless communication in accordance with various aspects of the present disclosure.

FIG. 14 is a flowchart of a method of wireless communication in accordance with various aspects of the present disclosure.

FIG. 15 is a flowchart of a method of wireless communication in accordance with various aspects of the present disclosure.

FIG. 16 is a flowchart of a method of wireless communication in accordance with various aspects of the present disclosure.

DETAILED DESCRIPTION

Figure 1:
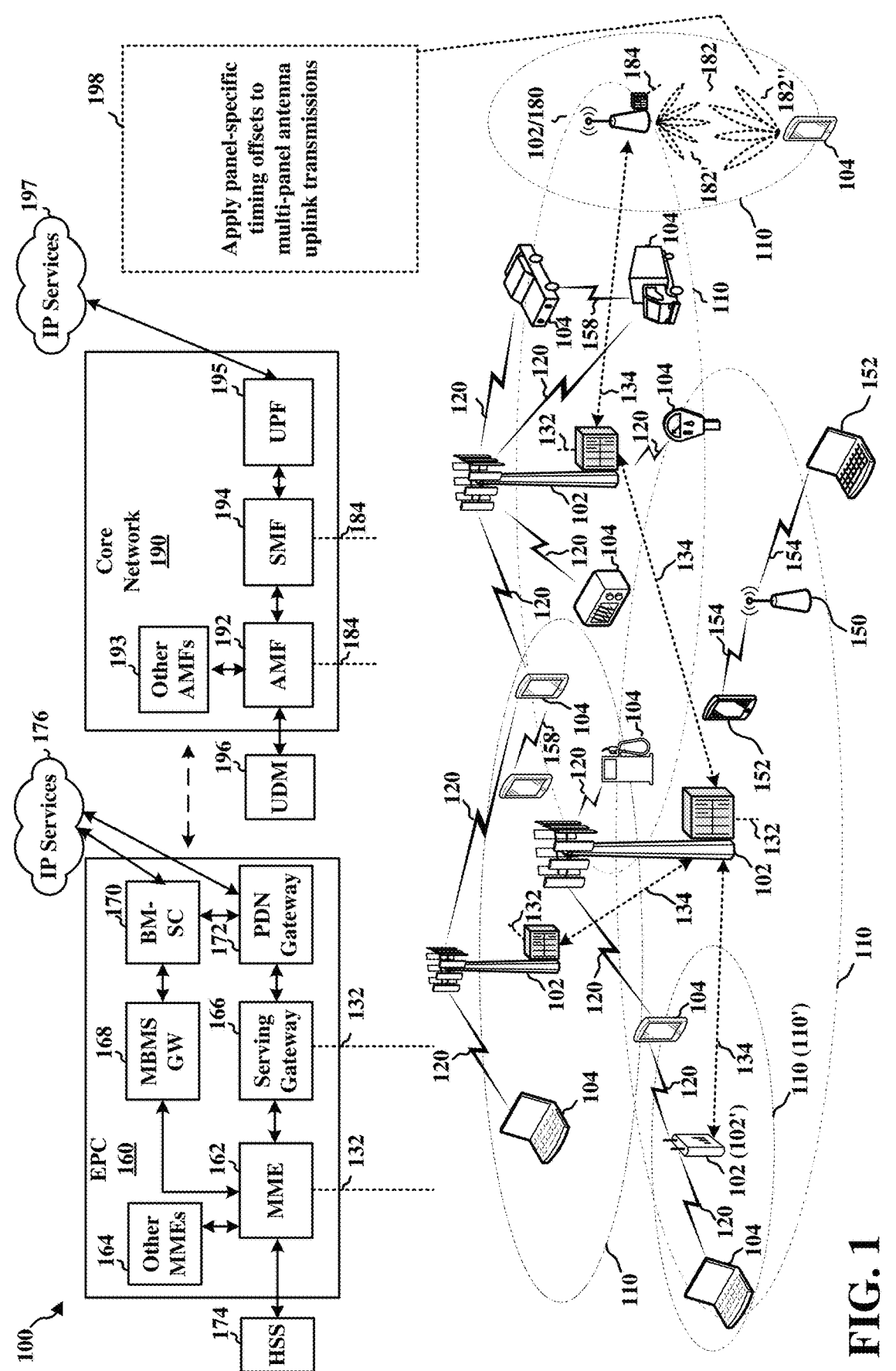
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to apply panel-specific timing offsets to multi-panel antenna uplink transmissions (198). Although the following description may be focused on 5G NR, the concepts described herein may be applicable to other similar areas, such as LTE, LTE-A, CDMA, GSM, and other wireless technologies.

Figures 2A, 2B, 2C, 2D:
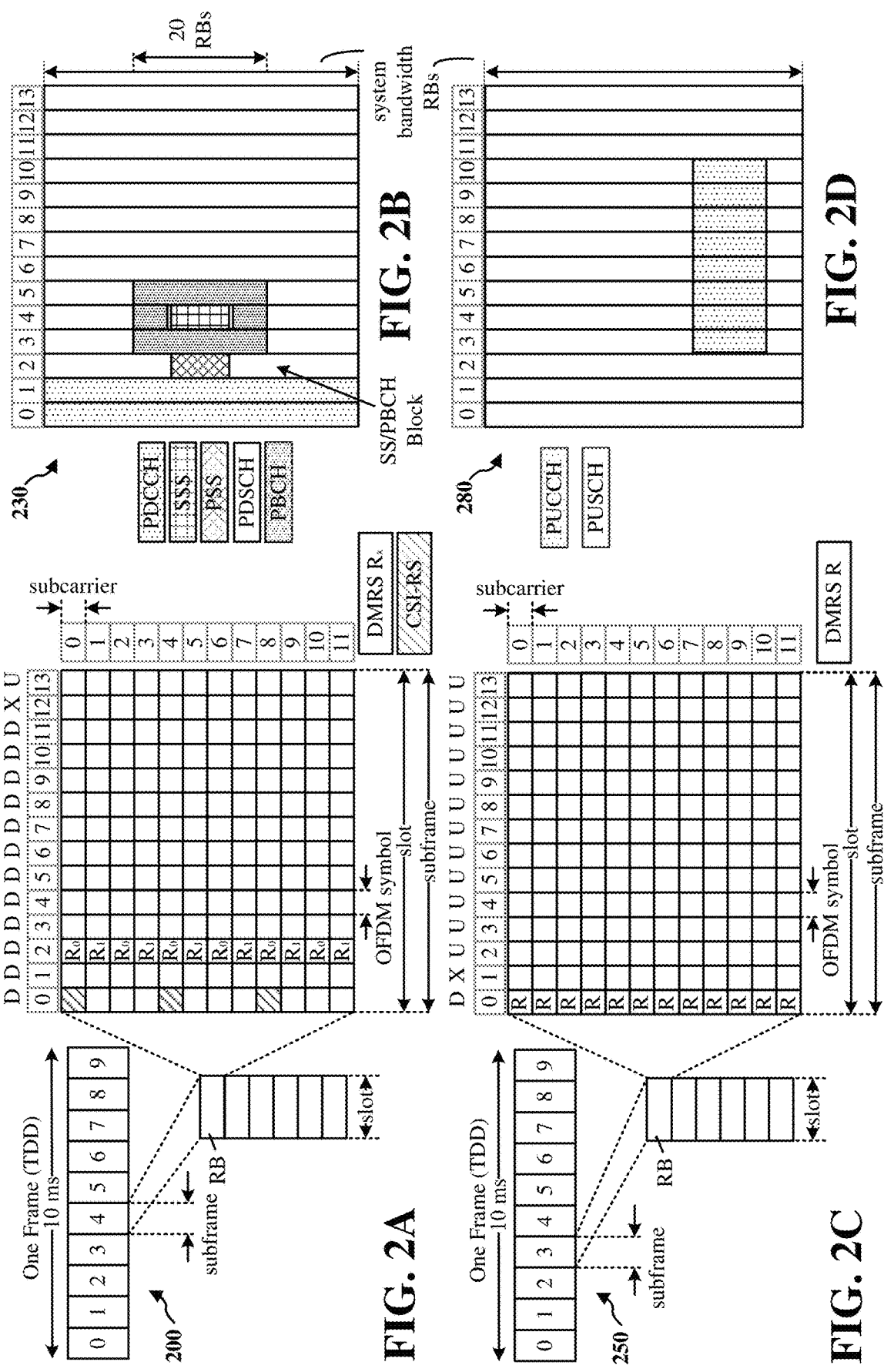
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
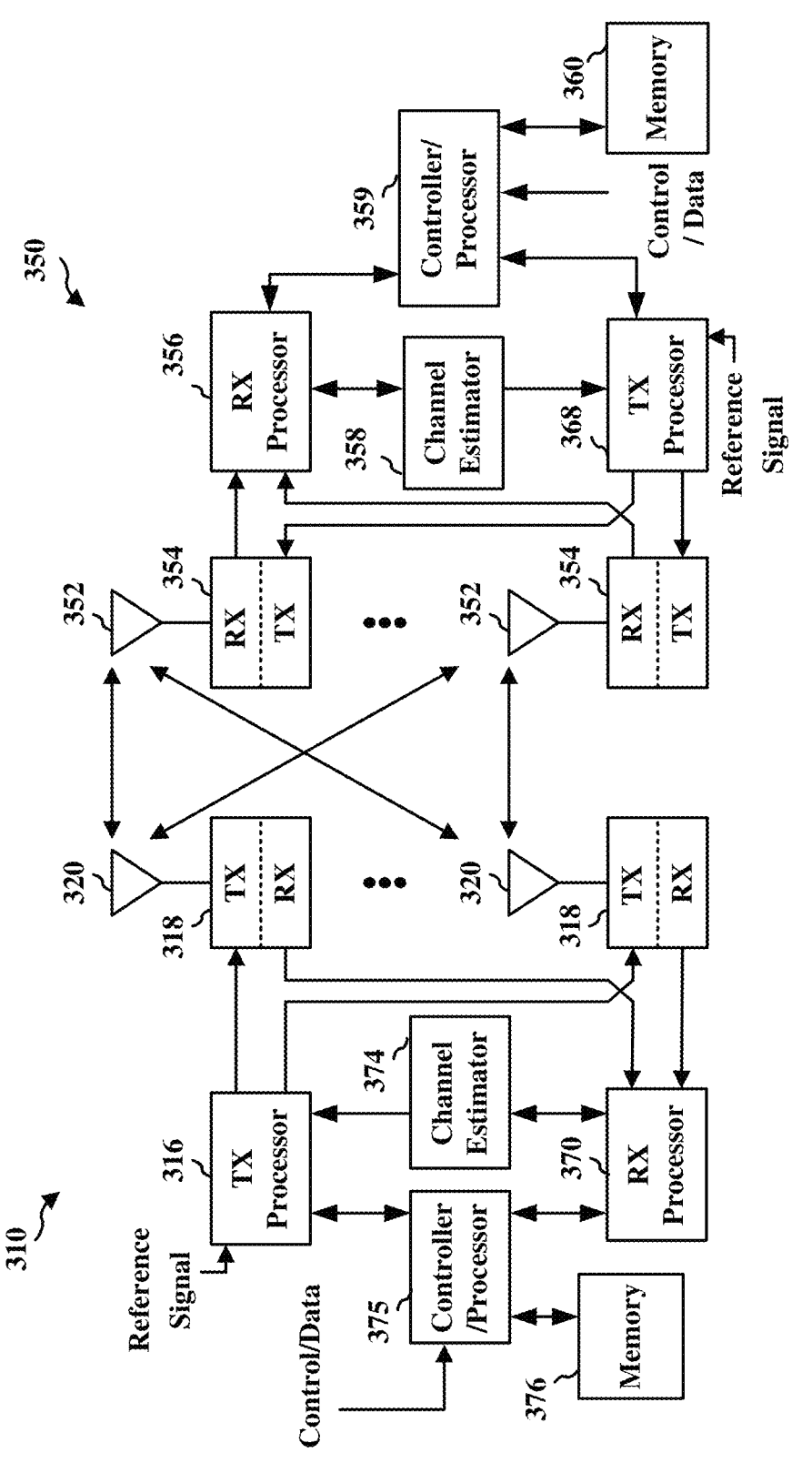
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

5G NR networks may support very large operating bandwidths relative to previous generations of cellular networks (e.g., LTE). However, requiring a UE to operate across the entire bandwidth of a 5G NR network may introduce unnecessary complexities to the operation of the UE and may significantly increase a UE's power consumption. Therefore, to avoid the need for the operating bandwidth of a UE to match the full bandwidth (also referred to as a carrier bandwidth or a component carrier bandwidth) of a cell in a 5G NR network, 5G NR introduces the concept of a bandwidth part (BWP). For example, a BWP (e.g., a configured frequency band) may allow a UE to operate with a narrower bandwidth (e.g., for wireless transmission and/or reception) than the full bandwidth of a cell. In some examples, BWPs may allow UEs with different bandwidth capabilities to operate in a cell with smaller instantaneous bandwidths relative to the full bandwidth configured for the cell. In some examples, a UE may not be required to transmit and or receive outside of the BWP assigned to the UE (also referred to as an active BWP of the UE).

In some examples, for a paired spectrum, a serving cell may configure a maximum of four DL BWPs and four UL BWPs. For an unpaired spectrum, a serving cell may configure a maximum of four DL/UL BWP pairs. For a supplementary uplink (SUL), a serving cell may configure a maximum of four UL BWPs.

Figure 4:
FIG. 4 illustrates example bandwidth parts (BWPs) configured for a user equipment (UE).

FIG. 4 illustrates example bandwidth parts (BWPs) configured for a user equipment (UE). As shown in FIG. 4, a first bandwidth part (BWP_1) 402A may be configured for the UE during a first time period 408, a second bandwidth part (BWP_2) 404A may be configured for the UE during a second time period 410, and a third bandwidth part (BWP_3) 406 may be configured for the UE during a third time period 412. In the example scenario shown in FIG. 4, the second bandwidth part (BWP_2) 404B may be configured for the UE during a fourth time period 414 and the first bandwidth part (BWP_1) 402B may be configured for the UE during a fifth time period 416. In some examples, the first bandwidth part (BWP_1) 402A, 402B may be 40 MHz, the second bandwidth part (BWP_2) 404A, 404B may be 10 MHz, and the third bandwidth part (BWP_3) 406 may be 20 MHz. In some examples, the first bandwidth part (BWP_1) 402A, 402B and the second bandwidth part (BWP_2) 404A, 404B may have a subcarrier spacing of 15 kHz, and the third bandwidth part (BWP_3) 406 may have a subcarrier spacing of 60 kHz.

FIG. 5 illustrates a wireless communication network 500 including a user equipment (UE) 502 and a base station 504. As shown in FIG. 5, the base station 504 may transmit to the UE 502 on the downlink (DL) (also referred to as a downlink transmission 506) and the UE 502 may transmit to the base station 504 on the uplink (UL) (also referred to as an uplink transmission 508). The downlink transmission 506 and the uplink transmission 508 may experience propagation delays, which may cause timing misalignments between the UE 502 and the base station 504 and may degrade the network performance. This is explained in greater detail with reference to FIG. 6.

FIG. 6 illustrates an example of a timing misalignment with reference to the previously described network 500. As shown in FIG. 6, the base station 504 may expect a reference time period 602 to begin at time $t_1$. In some examples, the reference time period 602 may represent a duration of a slot or one or more OFDM symbols (e.g., in an uplink subframe). As further shown in FIG. 6, if the UE 502 performs the uplink transmission 508 at time $t_1$, the uplink transmission 508 may not arrive at the base station 504 until time $t_2$ due to a propagation delay between the UE 502 and the base station 504. For example, the difference between $t_2$ and $t_1$ may increase as the distance between the UE 502 and the base station 504 increases. To avoid this timing misalignment, the UE 502 may perform an uplink transmission earlier (e.g., before time $t_1$) to compensate for the propagation delay. For example, as shown in FIG. 6, the UE 502 may perform an uplink transmission 604 at time $t_0$ to allow the uplink transmission 604 to arrive at the base station 504 at time $t_1$. In some examples, the difference between time $t_1$ and time $t_0$ may be approximately equal to the propagation delay between the UE 502 and the base station 504.

In 5G NR, a base station may transmit a timing advance (TA) command to a UE to adjust the timing of uplink transmissions from a UE. For example, the timing advance (TA) command may indicate a timing offset that the UE may apply to uplink transmissions. This timing offset may ensure that uplink transmissions from a UE are time aligned with a reference time at the network side (e.g., at the base station). For example, if the reference time at the base station is a beginning of an uplink subframe, the timing advance command may control (e.g., with a timing offset) when the UE performs an uplink transmission so that the uplink transmission arrives at the base station time aligned with the beginning of the uplink subframe.

A wireless communication network (e.g., a 5G NR network) may configure one or more BWP configurations for a UE in a serving cell using an information element (IE) herein referred to as a ServingCellConfig IE. The ServingCellConfig IE may include a parameter (herein referred to as tag-id) for indicating a timing advance group (TAG) identifier (Id), a parameter (herein referred to as initialDown-linkBWP) for indicating an initial downlink BWP configuration, a parameter (herein referred to as downlinkBWP-ToReleaseList) for indicating a list of additional downlink BWP configurations to be released (e.g., removed), and a parameter (herein referred to as downlinkBWP-ToAddMod-List) for indicating a list of additional downlink BWP configurations to be added. The downlinkBWP-ToAddMod-List parameter may indicate that multiple BWPs are configured for a UE.

In some examples, the ServingCellConfig IE may also contain cell-specific information, such as information that may enable the UE to perform a handover operation. The tag-Id may indicate the timing advance group which the serving cell belongs to. A timing advance group (TAG) may include one or more serving cells that share the same timing and apply the same downlink timing advance value. Table 1 shows an example structure of a ServingCellConfig IE in the Abstract Syntax Notation One (ASN.1) format.

TABLE 1

```
ServingCellConfig ::= SEQUENCE {
    . . .
    tag-Id, TAG-Id
    downlinkBWP-ToReleaseList
    downlinkBWP-ToAddModList
    . . .
}
```

Each BWP may be configured using an information element (IE) herein referred to as a BWP-DownlinkDedicated IE. The BWP-DownlinkDedicated IE may include dedicated (e.g., UE specific) parameters of a downlink BWP. In some examples, each BWP-DownlinkDedicated IE may include an information element (IE) containing a configuration for a control channel (herein referred to as a pdcch-Config IE). In some examples, the control channel may be a PDCCH. For example, the configuration for the control channel for the UE may include a radio resource control (RRC) configuration. Table 2 shows an example structure of a BWP-DownlinkDedicated IE in the Abstract Syntax Notation One (ASN.1) format.

TABLE 2

```
BWP-DownlinkDedicated ::= SEQUENCE {
    pdcch-Config
    . . .
}
```

The pdcch-Config IE may configure multiple control resource sets (CORESETs) for the control channel (e.g., for a PDCCH) using an information element (IE) herein referred to as a controlResourceSetToAddModList IE. In some examples, the controlResourceSetToAddModList IE may contain a list of UE specific control resource sets (CORESETs) to be used by the UE for a BWP. In some examples, the wireless communication network may configure up to five CORESETs per BWP per cell (including an initial CORESET). The pdcch-Config IE may further include an information element (IE) herein referred to as a controlResourceSetToReleaseList IE, which may indicate a list of CORESETs to be released (e.g., removed) for a BWP. Table 3 shows an example structure of a pdcch-Config IE in the Abstract Syntax Notation One (ASN.1) format.

TABLE 3

```
PDCCH-Config ::= SEQUENCE {
    controlResourceSetToAddModList
    controlResourceSetToReleaseList
    . . .
}
```

The network may configure a CORESET using an information element (IE) herein referred to as a ControlResource-Set IE. The ControlResourceSet IE may indicate a CORESET pool index value for the CORESET using a parameter herein referred to as coresetPoolIndex. The coresetPoolIndex parameter may be set to one of two values (e.g., either 0 or 1). In some examples, the coresetPoolIndex parameter may be used to support multiple transmission and reception points (multi-TRPs). For example, a first value (e.g., 0) for the coresetPoolIndex parameter may be associated with a first TRP in the downlink, and second value (e.g., 1) for the coresetPoolIndex parameter may be associated with a second TRP in the downlink. The ControlResourceSet IE may further indicate a CORESET identifier for the CORESET using a parameter herein referred to as controlResource-SetId. Table 4 shows an example structure of a ControlResourceSet IE in the Abstract Syntax Notation One (ASN.1) format.

TABLE 4

```
ControlResourceSet ::= SEQUENCE {
    coresetPoolIndex INTEGER (0..1)
    controlResourceSetId
    . . .
}
```

Therefore, a base station may configure the ServingCell-Config IE (e.g., Table 1) for a UE, where the ServingCell-Config IE includes one tag-Id and multiple BWPs. A control channel (e.g., a PDCCH) may be configured for each of these multiple BWPs using the BWP-DownlinkDedicated IE (e.g., Table 2), which includes the pdcch-Config IE. The pdcch-Config IE may configure multiple (CORESETs) for the control channel (e.g., for a PDCCH). Each of the CORESETs may be configured with the ControlResourceSet IE, where the ControlResourceSet IE indicates a CORESET pool index value for the CORESET and a CORESET identifier for the CORESET.

A UE may be equipped with an antenna array that includes multiple uplink antenna panels (e.g., panel 0 1821 and panel 1 1823 of the multi-panel antenna shown in FIG. 1820). In the aspects described herein, the terms "panel" and "uplink transmission panel" are used interchangeably and may refer to a panel of a multi-panel antenna array of a UE. In some examples, these multiple uplink panels may enable the UE to support multiple beams for uplink transmissions. In some aspects of the present disclosure, a single serving cell may be configured to support multiple timing advance group (TAG) identifiers (TAG-Ids). In these aspects, each of the multiple TAG-Ids may be used for different uplink panels of a UE when a BWP of the serving cell is configured to support multiple uplink panels.

In some aspects of the present disclosure, a serving cell may be configured to support multiple TAG-Ids using a ServingCellConfig IE that indicates a default tag Id and multiple TAG-Ids for a BWP. For example, the ServingCell-Config IE indicating a default tag Id and multiple TAG-Ids as disclosed herein may include a default TAG-Id parameter (e.g., default-tag), a first TAG-Id parameter (e.g., tag-Id0) and a second TAG-Id parameter (e.g., tag-Id1). In some aspects, the default TAG-Id parameter may be not configured, and the first TAG-Id parameter may serve as the default TAG-Id parameter. In some examples, each of the multiple TAG-Ids (e.g., tag-Id0, tag-Id1) may be associated with a different transmission and reception point (TRP). Table 5 shows an example structure of a ServingCellConfig IE in the Abstract Syntax Notation One (ASN.1) format in accordance with the various aspects of the present disclosure.

TABLE 5

```
ServingCellConfig ::= SEQUENCE {
    . . .
    default-tag, TAG-Id
    tag-Id0, TAG-Id
    tag-Id1, TAG-Id
    . . .
}
```

In some aspects of the present disclosure, a single serving cell may be configured to support multiple TAG-Ids as previously discussed using a ServingCellConfig IE that indicates a default TAG-Id and a TAG-Id pair for a BWP. For example, the ServingCellConfig IE indicating a default TAG-Id and a TAG-Id pair may include a default TAG-Id parameter (e.g., default-tag) and a TAG-Id pair information element (IE) herein referred to as a tag-pair IE. The tag-pair IE may contain a first TAG-Id parameter (e.g., tag-Id0) and a second TAG-Id parameter (e.g., tag-Id1). In some examples, each of the multiple TAG-Ids (e.g., tag-Id0, tag-Id1) may be associated with a different transmission and reception point (TRP). Table 6 shows an example structure of a ServingCellConfig IE including the default-tag and the tag-pair IE in the Abstract Syntax Notation One (ASN.1) format in accordance with various aspects of the present disclosure.

TABLE 6

```
ServingCellConfig ::= SEQUENCE {
    . . .
    default-tag, TAG-Id
    tag-pair SEQUENCE(SIZE (2)) {
        tag-Id0, TAG-Id
        tag-Id1, TAG-Id
    . . .
}
```

A timing advance group (TAG) may be configured via an RRC configuration using an information element (IE) herein referred to as a TAG IE. The TAG IE may include a TAG-Id parameter (e.g., tag-Id), a time alignment timer parameter, and/or other suitable parameters or information elements (IEs). A TAG-Id may be defined as an integer between 0 and N−1, where N represents the maximum number of TAG-Ids (e.g., TAG-Id::=INTEGER (0 . . . maxNrofTAGs−1) as expressed in the Abstract Syntax Notation One (ASN.1) format). Table 7 shows an example structure of a TAG IE in the Abstract Syntax Notation One (ASN.1) format.

TABLE 7

```
TAG ::= SEQUENCE {
    . . .
    tag-Id TAG-Id
    timeAlignmentTimer TimeAlignmentTimer,
    . . .
}
```

In some aspects of the present disclosure, if multi-panel uplink transmission is not configured for a BWP allocated to a UE in a serving cell, then the UE may be considered to lack support for multi-panel uplink transmissions. Therefore, the UE may support single panel uplink transmissions. In this scenario, even if the serving cell is configured to support multiple TAG-Ids as described herein, the default tag-Id may be used for a BWP allocated to a UE supporting single panel uplink transmissions. In other words, the default tag-Id enables the UE to fall back to a single TRP configuration where a single TAG-Id is configured for the serving cell.

In some aspects of the disclosure, the UE may determine that a BWP is configured for multi-panel uplink transmissions if coresetPoolIndex values for different CORESETs of a BWP are configured with different values (e.g., a value of a first coresetPoolIndex (e.g., 0) associated with a first CORESET is different from a value of a second coresetPoolIndex (e.g., 1) associated with a second CORESET). In some aspects of the disclosure, a UE may determine that a BWP lacks support for multi-panel uplink transmissions if different values have not been set for coresetPoolIndex parameters of the BWP. In other words, if the UE determines that the coresetPoolIndex parameters for all of the CORESETs (e.g., two or more CORESETs configured in a PDCCH-config IE for a control channel) have the same value (e.g., all of the coresetPoolIndex parameters are set to 0 or all of the coresetPoolIndex parameters are set to 1) or none of the coresetPoolIndex parameters are configured, the UE may conclude that the BWP has not been configured to support for multi-panel uplink transmissions.

In some aspects of the disclosure, a timing advance group (TAG) may be associated with a panel for uplink transmissions using a CORESET configuration (e.g., a ControlResourceSet IE). For example, a ControlResourceSet IE may indicate a CORESET pool index value for the CORESET using a coresetPoolIndex parameter. The coresetPoolIndex parameter may be set to one of two values (e.g., either 0 or 1). The coresetPoolIndex may be associated with a panel for uplink transmissions and may be used to identify the panel for uplink transmissions. Therefore, in some aspects of the disclosure, a ControlResourceSet IE may provide support for associating a tag-Id with a coresetPoolIndex. In one example, with reference to the example structure of a ControlResourceSet IE in the Abstract Syntax Notation One (ASN.1) format shown in Table 8, a ControlResourceSet IE may include a coresetPoolIndex parameter which may be set to one of two values (e.g., either 0 or 1), a controlResourceSetId parameter, and a parameter for associating a tag-Id with the coresetPoolIndex value. The parameter for associating a tag-Id with the coresetPoolIndex value is herein referred to as an associated-tag-Id parameter.

TABLE 8

```
ControlResourceSet ::= SEQUENCE {
    coresetPoolIndex           INTEGER (0..1),
    controlResourceSetId       ControlResourceSetId,
    associated-tag-Id          TAG-Id
    . . .
}
```

In another example, with reference to the example structure of a ControlResourceSet IE in the Abstract Syntax Notation One (ASN.1) format shown in Table 9, a ControlResourceSet IE may include a coresetPoolIndex parameter which may be set to one of two values (e.g., either 0 or 1), a controlResourceSetId parameter, and a parameter for associating a tag value with the coresetPoolIndex. The parameter for associating a tag value with the coresetPoolIndex is herein referred to as an associated-tag-value parameter. The associated-tag-value parameter may be set to one of two values (e.g., either 0 or 1) and may be used when the tag-Id to be associated with a coresetPoolIndex is one of a tag-pair as shown in Table 6. In one example, and with reference to Tables 6 and 9, the associated-tag-value parameter may be set to 0 to associate the tag-Id0 with the coresetPoolIndex, or may be set to 1 to associate the tag-Id1 with the coreset-PoolIndex.

TABLE 9

| ControlResourceSet ::= SEQUENCE { | |
| --- | --- |
| coresetPoolIndex | INTEGER (0..1), |
| controlResourceSetId | ControlResourceSetId, |
| associated-tag-value | INTEGER {0,1} |
| . . . | |
| } | |

Figure 7:
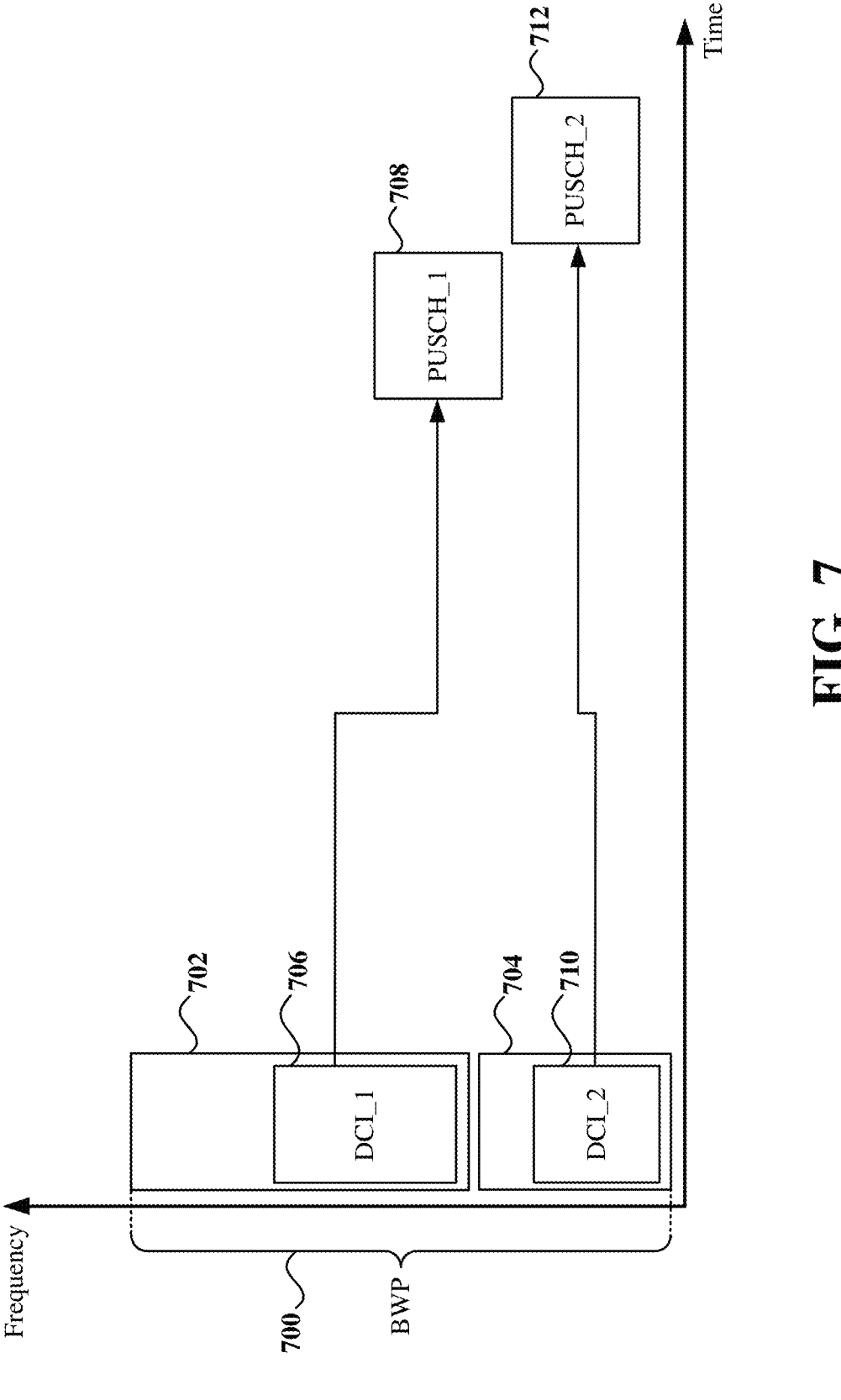
FIG. 7 illustrates a bandwidth part (BWP) that includes a first control resource set (CORESET) and a second control resource set (CORESET) in accordance with various aspects of the present disclosure.

In some aspects of the disclosure, a serving cell configured with multiple TAG-Ids may use multiple DCIs for scheduling multi-panel uplink transmissions at a UE. This scenario is described in detail with reference to FIG. 7. FIG. 7 illustrates a bandwidth part (BWP) 700 that includes a first CORESET 702 and a second CORESET 704. In some examples, the first and second CORESETS 702, 704 may be configured with different coresetPoolIndex values. For example, the first CORESET 702 may be configured with a coresetPoolIndex value of 0 and the second CORESET 704 may be configured with a coresetPoolIndex value of 1. As further shown in FIG. 7, the first CORESET 702 may include a first DCI (DCI_1) 706 that schedules a first uplink transmission on a first physical uplink shared channel (PUSCH_1) 708, and the second CORESET 704 may include a second DCI (DCI_2) 710 that schedules a second uplink transmission on a second physical uplink shared channel (PUSCH 2) 712. In some examples, the UE may perform an uplink transmission on the first physical uplink shared channel (PUSCH_1) 708 using a first panel, and an uplink transmission on the second physical uplink shared channel (PUSCH_2) 712 using a second panel.

Since the serving cell is configured with multiple TAG-Ids, the UE may determine the TAG-Id to be applied to an uplink transmission based on the CORESET configuration of the CORESET in which a DCI is received. As previously described with reference to Table 9, a CORESET may be configured with a coresetPoolIndex value of 0 or 1. In some aspects of the disclosure, a value indicating a TAG-Id for the CORESET (e.g., a value set for the associated-tag-value parameter shown in Table 9) and the coresetPoolIndex value configured for the CORESET may have the same value. In one example, if the first CORESET 702 is configured with a coresetPoolIndex set to 0 and if the associated-tag-value parameter for the first CORESET 702 is set to 0, the UE may apply tag-Id0 for the uplink transmission on the first physical uplink shared channel (PUSCH_1) 708. In another example, if the second CORESET 704 is configured with a coresetPoolIndex set to 1 and if the associated-tag-value parameter for the second CORESET 704 is set to 1, the UE may apply tag-Id1 for the uplink transmission on the second physical uplink shared channel (PUSCH_2) 712. Therefore, a UE may be able to apply different tag-Ids for different panels when performing multi-panel uplink transmissions.

In some aspects of the disclosure, when a serving cell is configured with multiple TAG-Ids and an uplink PUSCH transmission is based on a Type II uplink grant-free configuration in which a DCI activates semi-persistent uplink grant-free PUSCH transmission occasions and the UE can transmit the PUSCH in the occasions without a DCI scheduling, a UE may determine the TAG configuration based on the coresetPoolIndex of the CORESET in which the activation DCI is received.

In some aspects of the disclosure, when a serving cell is configured with multiple TAG-Ids and an uplink PUSCH transmission is based on a Type I uplink grant configuration in which RRC signaling configures periodical uplink grant-free PUSCH transmission occasions and UE can transmit the PUSCH in the occasions without a DCI scheduling, the UE may determine the TAG configuration by an RRC configuration.

In some aspects of the disclosure, when a serving cell is configured with multiple TAG-Ids and the UE is configured with a PUCCH resource, the UE may determine the TAG configuration for a PUCCH transmission using one or two options. In a first option, the UE may determine the TAG configuration for a PUCCH transmission from an RRC configuration (e.g., when the PUCCH is used for a periodical transmission). In a second option, the UE may determine the TAG configuration for a PUCCH transmission from a DCI triggering the PUCCH (e.g., when the PUCCH is for an aperiodical transmission triggered by DCI, such as an aperiodical CSI report).

In some aspects of the disclosure, when a serving cell is configured with multiple TAG-Ids and the TAG configuration to be applied to an uplink transmission (e.g., a sounding reference signal (SRS)) in a BWP is not indicated to the UE, the UE may apply the first or default TAG configuration configured for the serving cell.

In some aspects of the present disclosure, a UE may support a non-accumulative timing offset for each uplink transmission panel. FIG. 8 illustrates an example signal flow diagram for indicating a cell-specific TA command and a panel-specific TA offset to a UE. As shown in FIG. 8, a UE 802 may receive a cell-specific TA command 806 from a base station 804. The UE 802 may further receive a panel-specific TA offset 808 from the base station 804. The application of the cell-specific TA command 806 and the panel-specific TA offset 808 at the UE 802 is described in detail with reference to FIG. 9. In some aspects of the disclosure, and as described in detail with reference to FIGS. 11 and 12, the UE 802 may receive the cell-specific TA command and the panel-specific TA offset(s) in a medium access control (MAC) control element (MAC-CE).

Figure 9:
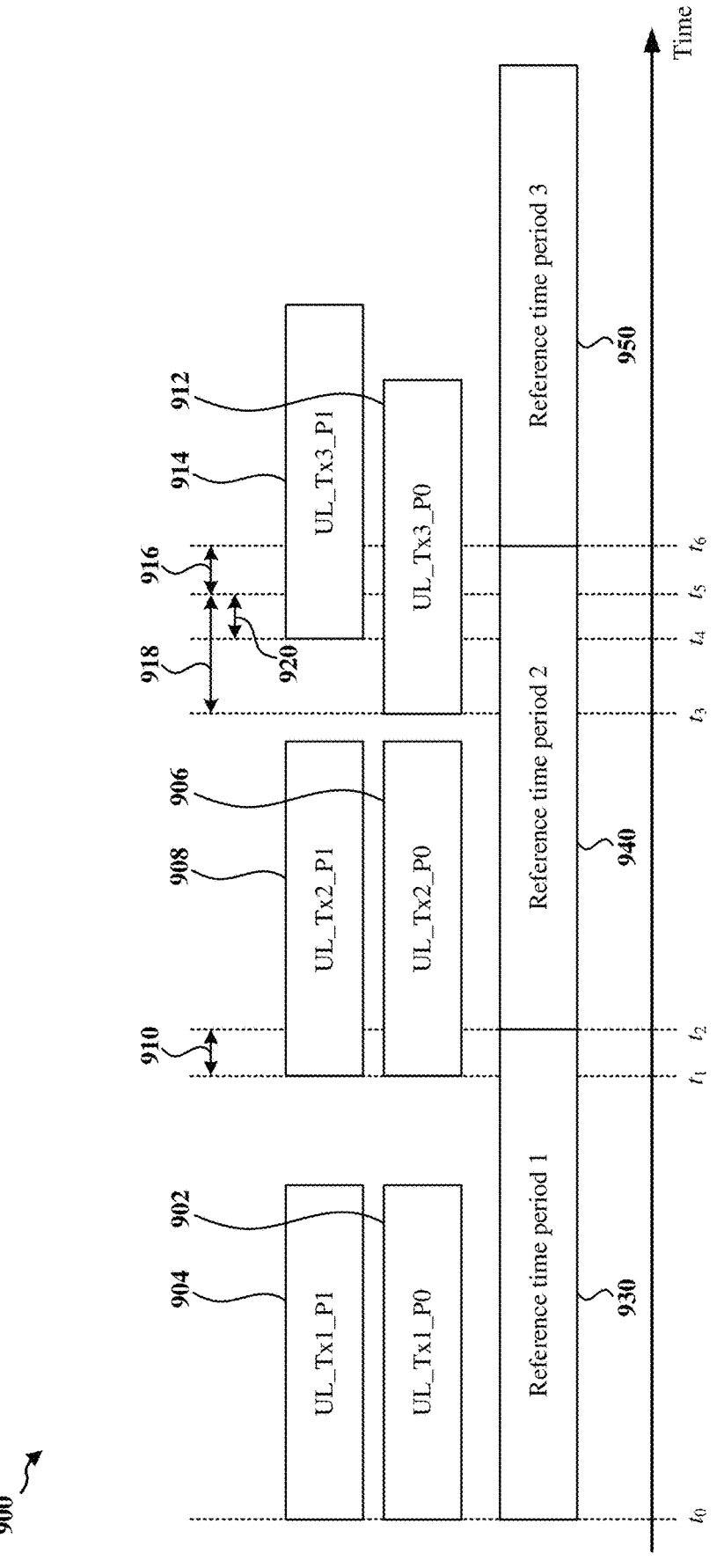
FIG. 9 illustrates a multi-panel uplink transmission timing diagram for a user equipment (UE) in accordance with various aspects of the present disclosure.

FIG. 9 illustrates a multi-panel uplink transmission timing diagram 900 for a UE (e.g., UE 802 in FIG. 8) in accordance with various aspects of the present disclosure. In FIG. 8, the UE is configured to perform uplink transmissions from a first panel (also referred to as panel 0 or P0) and a second panel (also referred to as panel 1 or P1). Therefore, in a first scenario, a UE may use the first panel (e.g., P0) to perform an uplink transmission (UL_Tx1_P0) 902 and a second panel (e.g., P1) to perform an uplink transmission (UL_Tx1_P1) 904. As shown in FIG. 9, the uplink transmissions UL_Tx1_P0 902 and UL_Tx1_P1 904 may arrive at the base station time aligned at a reference time to of the base station. The reference time to may be a beginning of a first reference time period 930 of the base station (e.g., base station 804 in FIG. 8). In some examples, the first reference time period 930 may represent a duration of a slot or one or more OFDM symbols. Therefore, the first scenario illustrates a multi-panel uplink transmission timing where neither a cell-specific timing offset (e.g., of a cell-specific TA command) nor a panel-specific timing offset is applied at the UE.

In a second scenario, if the UE performs an uplink transmission from the first panel (e.g., P0) and an uplink transmission from the second panel (e.g., P1), the uplink transmissions may arrive at the base station at approximately the same time, but may not arrive at the base station time aligned at a reference time of the base station (e.g., due to propagation delays). In this scenario, the base station may transmit a cell-specific TA command (e.g., the cell-specific TA command 806) including a cell-specific timing offset $N_{TA}$ to the UE. In some examples, the cell-specific timing offset $N_{TA}$ may indicate an index value TA=(0, 1, 2, . . . , 63) that is used to control the amount of timing adjustment that the UE applies to an uplink transmission. In some examples, the UE may be configured to apply the cell-specific timing offset $N_{TA}$ to all uplink transmissions and in all BWPs.

For example, with reference to FIG. 9, the cell-specific timing offset $N_{TA}$ may indicate to the UE that an uplink transmission is to be offset by a first time value 910. This may allow the uplink transmissions to arrive at the base station time aligned at a reference time $t_2$ of the base station. The reference time $t_2$ may be a beginning of a second reference time period 940 of the base station (e.g., base station 804 in FIG. 8). In some examples, the second reference time period 940 may represent a duration of a slot or one or more OFDM symbols. Therefore, when the UE is to perform an uplink transmission from the first panel (UL_Tx2_P0) 906 and an uplink transmission from the second panel (UL_Tx2_P1) 908, the UE may apply the cell-specific timing offset $N_{TA}$ to both the first panel and the second panel. For example, the UE may perform both uplink transmissions UL_Tx2_P0 906 and UL_Tx2_P1 908 at time $t_1$, where $t_2-t_1$ is approximately equal to the first time value 910 indicated by the cell-specific timing offset $N_{TA}$.

In a third scenario, if the UE performs an uplink transmission from the first panel (e.g., P0) and an uplink transmission from the second panel (e.g., P1), the uplink transmissions may arrive at the base station at different times and may not arrive time aligned at a reference time of the base station (e.g., due to propagation delays). In this scenario, the base station may transmit a cell-specific TA command (e.g., the cell-specific TA command 806) including a cell-specific timing offset $N_{TA}$ to the UE. In some examples, the cell-specific timing offset $N_{TA}$ may indicate an index value TA=(0, 1, 2, . . . , 63) that is used to control the amount of timing adjustment that the UE applies to an uplink transmission. The base station may further transmit a panel-specific timing advance (TA) offset indication (e.g., the panel-specific TA offset 808 in FIG. 8) to the UE including a first timing offset $\delta_0$ for the first panel (e.g., P0) and a second timing offset $\delta_1$ for the second panel (e.g., P1). Therefore, a total timing offset $N_{TA0}$ applied by the UE for the first panel (e.g., P0) may be expressed as $N_{TA}+\delta_0$, and a total timing offset $N_{TA1}$ applied by the UE for the second panel (e.g., P1) may be expressed as $N_{TA}+\delta_1$.

For example, with reference to FIG. 9, the cell-specific timing offset $N_{TA}$ may indicate to the UE that an uplink transmission is to be offset by a first time value 916. In addition, the first timing offset $\delta_0$ for the first panel (e.g., P0) may indicate to the UE that an uplink transmission from the first panel (e.g., P0) is to be further offset by a second time value 918. The second timing offset $\delta_1$ for the second panel (e.g., P1) may indicate to the UE that an uplink transmission from the second panel (e.g., P1) is to be further offset by a third time value 920. Accordingly, as shown in FIG. 9, an uplink transmission from the first panel (UL_Tx3_P0) 912 may be offset by an amount approximately equal to the sum of the first time value 916 and the second time value 918. An uplink transmission from the second panel (UL_Tx3_P1) 914 may be offset by an amount approximately equal to the sum of the first time value 916 and the third time value 920.

Therefore, the UE may perform the uplink transmission from the first panel (UL_Tx3_P0) 912 at time $t_3$ and may perform the uplink transmission from the second panel (UL_Tx3_P1) 914 at time $t_4$. This may allow the uplink transmissions UL_Tx3_P0 912 and UL_Tx3_P1 914 to arrive at the base station time aligned at a reference time $t_6$ of the base station. The reference time $t_6$ may be a beginning of a third reference time period 950 of the base station (e.g., base station 804 in FIG. 8). In some examples, the third reference time period 950 may represent a duration of a slot or one or more OFDM symbols.

In some aspects of the disclosure, an identity of an uplink transmission panel (also referred to as a panel Id) may be associated with a coresetPoolIndex value. In these aspects, a UE may apply a panel-specific timing advance (TA) offset associated with a coresetPoolIndex value to an uplink transmission panel associated with the same coresetPoolIndex value.

In some aspects of the disclosure, if a UE has previously received a cell-specific timing advance (TA) command (e.g., including a cell-specific timing offset $N_{TA}$) and a panel-specific timing advance (TA) offset indication (e.g., including a first timing offset $\delta_0$ for the first panel and/or a second timing offset $\delta_1$ for the second panel), and if the UE receives a subsequent (e.g., new) cell-specific TA command, the UE may apply one of two options. In a first option, the UE may maintain the first timing offset $\delta_0$ for the first panel and/or the second timing offset $\delta_1$ for the second panel, but may update the cell-specific timing offset $N_{TA}$. Otherwise, in a second option, the UE may update the cell-specific timing offset $N_{TA}$, but may reset the first timing offset $\delta_0$ for the first panel and/or the second timing offset $\delta_1$ for the second panel. In other words, the UE may set the values of $\delta_0$ and $\delta_1$ to zero when the UE receives a new cell-specific TA command. In some aspects of the disclosure, if a BWP configured for the UE is not configured to support multi-panel uplink transmissions, the UE may not apply a panel-specific TA offset to uplink transmissions.

Figure 10:
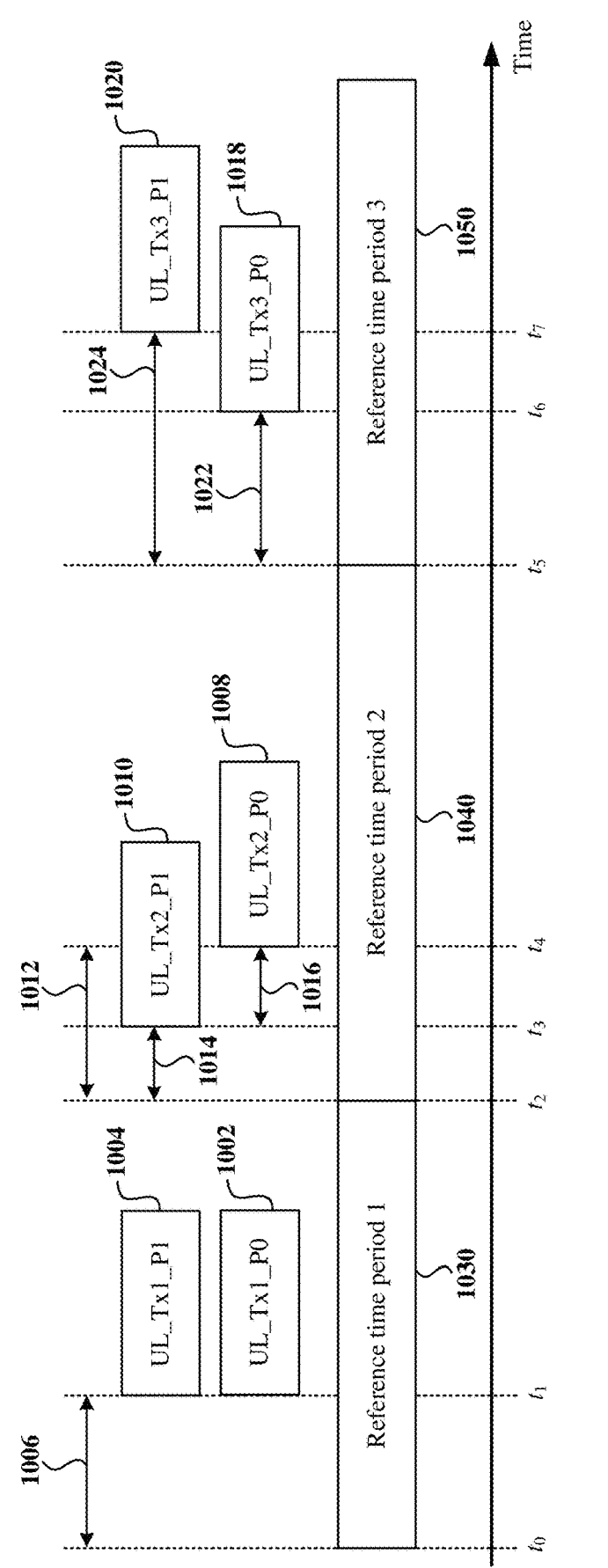
FIG. 10 illustrates example applications of timing advance group (TAG) offset indications at a user equipment (UE) in accordance with various aspects of the present disclosure.

FIG. 10 illustrates example applications of TAG offset indications at a UE in accordance with various aspects of the present disclosure. In a first scenario, if the UE performs an uplink transmission from the first panel (UL_Tx1_P0) 1002 and an uplink transmission from the second panel (UL_Tx1_P1) 1004 without applying any timing offsets, the uplink transmissions may arrive at the base station at approximately the same time at time $t_1$ but may not arrive at the base station time aligned at a first reference time $t_0$ of the base station (e.g., due to propagation delays). The first reference time $t_0$ may be a beginning of a first reference time period 1030 of the base station (e.g., base station 804 in FIG. 8). In some examples, the first reference time period 1030 may represent a duration of a slot or one or more OFDM symbols.

As shown in FIG. 10, the uplink transmissions UL_Tx1_P0 1002 and UL_Tx1_P1 1004 may be delayed by a delay period 1006 relative to the first reference time to of the base station. The delay period 1006 may be approximately equal to two times a one-way propagation delay period $T_{P0}$ between the first panel (e.g., P0) of the UE and the base station, and may also be approximately equal to two times a one-way propagation delay period $T_{P1}$ between the second panel (e.g., P1) of the UE and the base station. In other words, the delay period 1006 may be approximately equal to $2T_{P0}=2T_{P1}$. In this scenario, a total timing offset $N_{T40}$ to be applied to the first panel may be expressed as $N_{T40}=N_{T4}+TA$, and a total timing offset $N_{T41}$ to be applied to the second panel may be expressed as $N_{T41}=N_{T4}$ TA, where $N_{T4}$ represents a cell-specific timing offset value based on a timing advance group (TAG), and TA represents a timing advance offset approximately equal to $2T_{P0}$. It should be noted that no panel-specific timing offsets are applied in this scenario since the uplink transmissions UL_Tx1_P0 1002 and UL_Tx1_P1 1004 arrive at the base station at approximately the same time. In other words, the propagation delay of the first panel is approximately equal to the propagation delay of the second panel (e.g., $2T_{P0}=2T_{P1}$).

In a second scenario, if the UE performs an uplink transmission from the first panel (UL_Tx2_P0) 1008 and an uplink transmission from the second panel (UL_Tx2_P1) 1010 without applying any timing offsets, the uplink transmissions may arrive at the base station at different times (e.g., at times $t_4$ and $t_3$, respectively) and may not arrive at the base station time aligned at a second reference time $t_2$ of the base station (e.g., due to propagation delays). The second reference time $t_2$ may be a beginning of a second reference time period 1040 of the base station (e.g., base station 804 in FIG. 8). In some examples, the second reference time period 1040 may represent a duration of a slot or one or more OFDM symbols.

As shown in FIG. 10, the uplink transmission UL_Tx2_P0 1008 may be delayed by a delay period 1012 relative to the second reference time $t_2$ of the base station, and the uplink transmission UL_Tx2_P1 1010 may be delayed by a delay period 1014 relative to the second reference time $t_2$ of the base station. The delay period 1012 may be approximately equal to two times a one-way propagation delay period $T_{P0}$ between the first panel (e.g., P0) of the UE and the base station, and the delay period 1014 may be approximately equal to two times a one-way propagation delay period $T_{P1}$ between the second panel (e.g., P1) of the UE and the base station, where $2T_{P0}>2T_{P1}$. In this scenario, a total timing offset $N_{T40}$ to be applied to the first panel may be expressed as $N_{T40}=N_{T4}+TA+2(T_{P0}-T_{P1})$, and a total timing offset $N_{T41}$ to be applied to the second panel may be expressed as $N_{T41}=N_{T4}+TA$, where $N_{T4}$ represents a cell-specific timing offset value based on a timing advance group (TAG), and TA represents a timing advance offset approximately equal to $2T_{P1}$. It should be noted that the term $2(T_{P0}-T_{P1})$ in the total timing offset $N_{T40}$ to be applied to the first panel represents a panel-specific timing offset for the first panel. This panel-specific timing offset is applied because the propagation delay of the first panel is greater than the propagation delay of the second panel (e.g., $2T_{P0}>2T_{P1}$).

In a third scenario, if the UE performs an uplink transmission from the first panel (UL_Tx3_P0) 1018 and an uplink transmission from the second panel (UL_Tx3_P1) 1020 without applying any timing offsets, the uplink transmissions may arrive at the base station at different times (e.g., at times $t_6$ and $t_7$, respectively) and may not arrive at the base station time aligned at a third reference time $t_5$ of the base station (e.g., due to propagation delays). The third reference time $t_5$ may be a beginning of a third reference time period 1050 of the base station (e.g., base station 804 in FIG. 8). In some examples, the third reference time period 1050 may represent a duration of a slot or one or more OFDM symbols.

As shown in FIG. 10, the uplink transmission UL_Tx3_P0 1018 may be delayed by a delay period 1022 relative to the third reference time $t_5$ of the base station, and the uplink transmission UL_Tx3_P1 1020 may be delayed by a delay period 1024 relative to the second reference time $t_2$ of the base station. The delay period 1022 may be approximately equal to two times a one-way propagation delay period $T_{P0}$ between the first panel (e.g., P0) of the UE and the base station, and the delay period 1024 may be approximately equal to two times a one-way propagation delay period $T_{P1}$ between the second panel (e.g., P1) of the UE and the base station, where $2T_{P1}>2T_{P0}$. In this scenario, a total timing offset $N_{T40}$ to be applied to the first panel may be expressed as $N_{T40}=N_{T4}+TA$, and a total timing offset $N_{T41}$ to be applied to the second panel may be expressed as $N_{T41}=N_{T4}+TA+2(T_{P1}-T_{P0})$, where $N_{T4}$ represents a cell-specific timing offset value based on a timing advance group (TAG) and TA represents a timing advance offset approximately equal to $2T_{P0}$. It should be noted that the term $2(T_{P1}-T_{P0})$ in the total timing offset $N_{T41}$ to be applied to the second panel represents a panel-specific timing offset for the second panel. This panel-specific timing offset is applied because the propagation delay of the second panel is greater than the propagation delay of the first panel (e.g., $2T_{P1}>2T_{P0}$).

Figure 11:
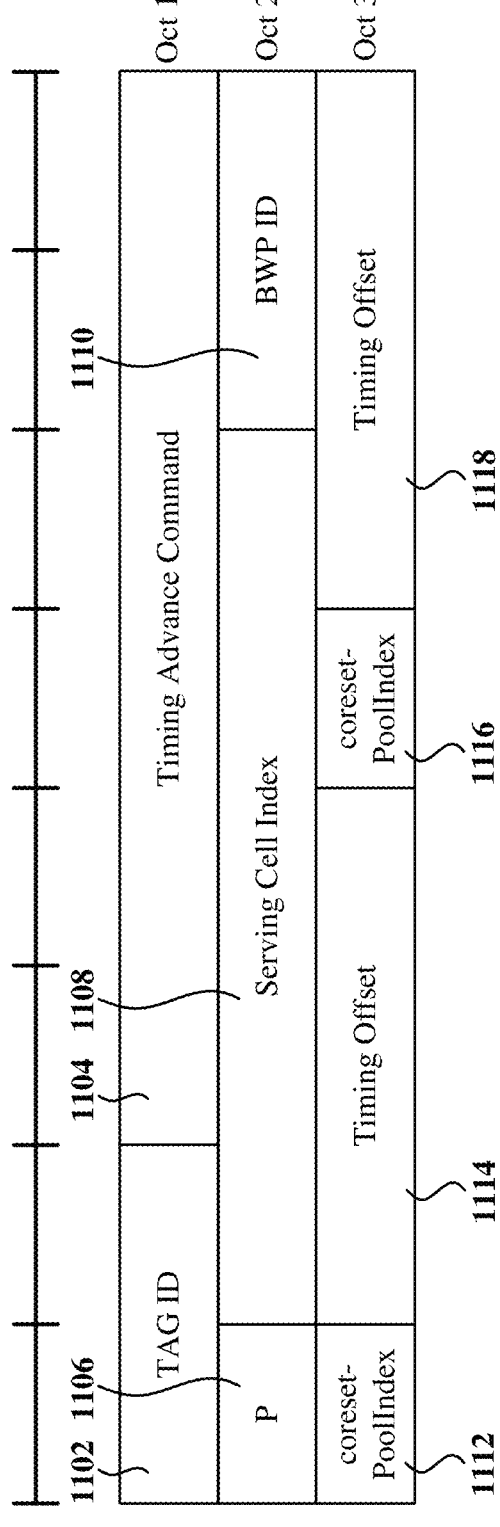
FIG. 11 illustrates an example medium access control (MAC) control element (MAC-CE) for indicating a cell-specific timing advance (TA) command and a panel-specific timing advance (TA) offset to a user equipment (UE) in accordance with various aspects of the present disclosure.

FIG. 11 illustrates an example medium access control (MAC) control element (MAC-CE) 1100 for indicating a cell-specific timing advance (TA) command and a panel-specific timing advance (TA) offset to a UE in accordance with various aspects of the present disclosure. As shown in FIG. 11, the MAC-CE 1100 may include a timing advance group (TAG) identifier (ID) field 1102, a timing advance command field 1104, a reserved field 1106, a serving cell index field 1108, a bandwidth part (BWP) identifier (BWP ID) field 1110, a first coreset-PoolIndex field 1112, a first timing offset field 1114, a second coreset-PoolIndex field 1116, and a second timing offset field 1118.

As shown in FIG. 11, the MAC-CE 1100 may include three octets. The timing advance group (TAG) identifier (ID) field 1102 may include two bits and may be used to indicate a timing advance group (TAG). The timing advance command field 1104 may include a 6-bit timing advance command that is to be applied to cells in the indicated TAG. For example, the 6-bit timing advance command may indicate an index value TA=(0, 1, 2, . . . , 63) that is used to control the amount of timing adjustment that the UE applies to an uplink transmission. The serving cell index field 1108 may include five bits and may be used to identify the serving cell that applies the timing advance command (e.g., the timing offset). The BWP ID field 1110 may include two bits and may be used to identify a BWP.

The first coreset-PoolIndex field 1112 may include one bit and may be used to identify a first coreset-PoolIndex in the identified BWP. The first timing offset field 1114 may include three bits and may be used to indicate a first timing offset associated with the first coreset-PoolIndex. The second coreset-PoolIndex field 1116 may include one bit and may be used to identify a second CORESET-PoolIndex in the identified BWP. The second timing offset field 1118 may include three bits and may be used to indicate a second timing offset associated with the second coreset-PoolIndex. In some aspects of the present disclosure, a UE configured for multi-panel uplink transmissions (e.g., uplink transmissions from a first panel P0 and a second panel P1) may associate the first coreset-PoolIndex with a first panel (e.g., P0) and may associate the second coreset-PoolIndex with a second panel (e.g., P1). Accordingly, the UE may apply the first timing offset (e.g., in the first timing offset field 1114) to uplink transmissions from the first panel and may apply the second timing offset (e.g., in the second timing offset field 1118) to uplink transmissions from the second panel.

Therefore, the first and second timing offsets in the first and second timing offset fields 1114, 1118 may serve as panel-specific timing offset indications.

Figure 12:
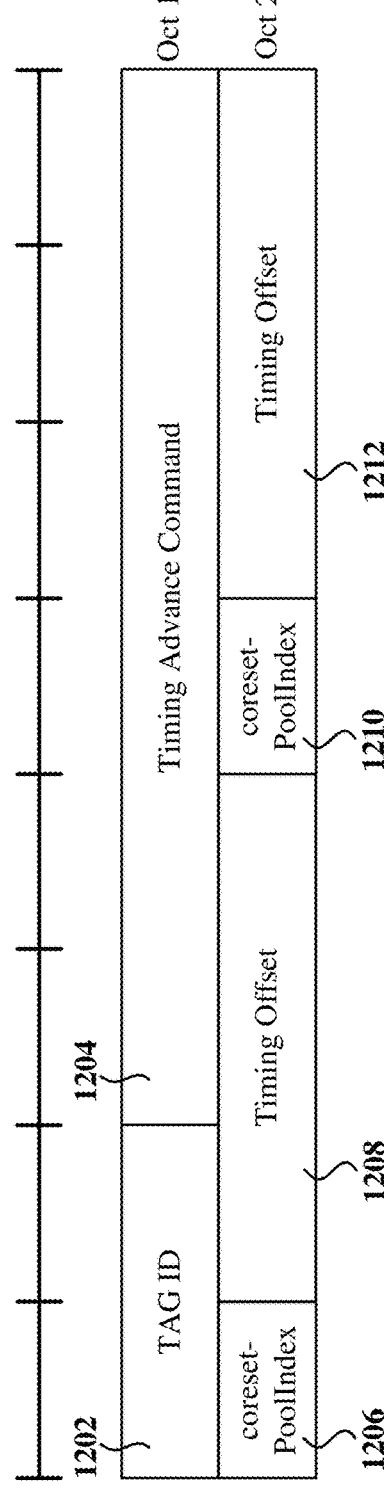
FIG. 12 illustrates an example medium access control (MAC) control element (MAC-CE) for indicating a cell-specific timing advance (TA) command and a panel-specific timing advance (TA) offset to a user equipment (UE) in accordance with various aspects of the present disclosure.

FIG. 12 illustrates an example medium access control (MAC) control element (MAC-CE) 1200 for indicating a cell-specific timing advance (TA) command and a panel-specific timing advance (TA) offset to a UE in accordance with various aspects of the present disclosure. As shown in FIG. 12, the MAC-CE 1200 may include a timing advance group (TAG) identifier (ID) field 1202, a timing advance command field 1204, a first coreset-PoolIndex field 1206, a first timing offset field 1208, a second coreset-PoolIndex field 1210, and a second timing offset field 1212.

As shown in FIG. 12, the MAC-CE 1200 may include two octets. The timing advance group (TAG) identifier (ID) field 1202 may include two bits and may be used to indicate a timing advance group (TAG). The timing advance command field 1204 may include a 6-bit timing advance command that is to be applied to cells in the indicated TAG. For example, the 6-bit timing advance command may indicate an index value TA=(0, 1, 2, . . . , 63) that is used to control the amount of timing adjustment that the UE applies to an uplink transmission.

The first coreset-PoolIndex field 1206 may include one bit and may be used to identify a first coreset-PoolIndex. The first timing offset field 1208 may include three bits and may be used to indicate a first timing offset associated with the first coreset-PoolIndex. The second coreset-PoolIndex field 1210 may include one bit and may be used to identify a second coreset-PoolIndex. The second timing offset field 1212 may include three bits and may be used to indicate a second timing offset associated with the second coreset-PoolIndex. In some aspects of the present disclosure, a UE configured for multi-panel uplink transmissions (e.g., uplink transmissions from a first panel P0 and a second panel P1) may associate the first coreset-PoolIndex with a first panel (e.g., P0) and may associate the second coreset-PoolIndex with a second panel (e.g., P1). Accordingly, the UE may apply the first timing offset (e.g., in the first timing offset field 1208) to uplink transmissions from the first panel and may apply the second timing offset (e.g., in the second timing offset field 1212) to uplink transmissions from the second panel. Therefore, the first and second timing offsets in the first and second timing offset fields 1208, 1212 may serve as panel-specific timing offset indications.

In some aspects of the disclosure, when a UE configured for multi-panel uplink transmissions in multiple serving cells receives the MAC-CE 1200, the UE may apply the first and second timing offsets (e.g., in the first and second timing offset fields 1208, 1212) to uplink transmissions from the respective first and second panels in all the serving cells and for all BWPs sharing the same coresetPoolIndex values. In other words, the UE may apply the same timing offset (e.g., the first timing offset) for the first panel and the same timing offset (e.g., the second timing offset) for the second panel in all of the serving cells for which UE configured for multi-panel uplink transmissions.

FIG. 13 is a flowchart 1300 of a method of wireless communication. The method may be performed by a UE (e.g., the UE 104; the apparatus 1702/1702'; the processing system 1814, which may include the memory 360 and which may be the entire UE 104 or a component of the UE 104, such as the TX processor 368, the RX processor 356, and/or the controller/processor 359). In FIG. 13, blocks with dashed lines (e.g., block 1308) indicate optional blocks.

At block 1302, the UE receives configuration information for a serving cell, the configuration information indicating at least one bandwidth part and at least two timing advance group identifiers for the serving cell (e.g., tag-Id0 and tag-Id1 in Table 5).

At block 1304, the UE determines whether the at least one bandwidth part is configured to support uplink transmissions from a plurality of antenna panels of the user equipment. In some examples, the UE may determine that a BWP is configured for multi-panel uplink transmissions if coreset-PoolIndex values for different CORESETs of a BWP are configured with different values (e.g., a value of a first coresetPoolIndex (e.g., 0) associated with a first CORESET is different from a value of a second coresetPoolIndex (e.g., 1) associated with a second CORESET).

At block 1306, the UE performs a first uplink transmission from a first antenna panel of the plurality of antenna panels based on a first timing advance group identifier of the at least two timing advance group identifiers and a second uplink transmission from a second antenna panel of the plurality of antenna panels based on a second timing advance group identifier of the at least two timing advance group identifiers when the at least one bandwidth part is configured to support the uplink transmissions from the plurality of antenna panels. For example, with reference to FIG. 7, the UE may perform the first uplink transmission on the first physical uplink shared channel (PUSCH_1) 708, and may perform the second uplink transmission on a second physical uplink shared channel (PUSCH_2) 712. In some examples, the UE may perform the first uplink transmission on the first physical uplink shared channel (PUSCH_1) 708 using a first antenna panel (e.g., panel 0 1821 of the multi-panel antenna 1820 in FIG. 18) and may perform the second uplink transmission on the second physical uplink shared channel (PUSCH_2) 712 using a second antenna panel (e.g., panel 1 1823 of the multi-panel antenna 1820 in FIG. 18).

At block 1308, the UE performs a third uplink transmission based on a default timing advance group identifier (e.g., Table 5, Table 6) when the at least one bandwidth part is not configured to support the uplink transmissions from the plurality of antenna panels. The default timing advance group identifier may be one of the at least two timing advance group identifiers for the serving cell.

FIG. 14 is a flowchart 1400 of a method of wireless communication. The method may be performed by a UE (e.g., the UE 104; the apparatus 1702/1702'; the processing system 1814, which may include the memory 360 and which may be the entire UE 104 or a component of the UE 104, such as the TX processor 368, the RX processor 356, and/or the controller/processor 359). In FIG. 13, blocks with dashed lines (e.g., blocks 1404, 1406, 1408, 1412) indicate optional blocks.

At block 1402, the UE receives configuration information for a serving cell (e.g., the ServingCellConfig IE in Table 5, Table 6), the configuration information indicating at least one bandwidth part and at least two timing advance group identifiers for the serving cell.

At block 1404, the UE receives at least one control resource set configuration (e.g., the ControlResourceSet IE in Table 8) for a control channel in the at least one bandwidth part, the at least one control resource set configuration indicating a control resource set pool index and a timing advance group identifier of the at least two timing advance group identifiers associated with the control resource set pool index.

At block 1406, the UE receives, in a first control resource set of the at least one bandwidth part, first downlink control information (e.g., DCI 706 in FIG. 7) scheduling the first uplink transmission, the first control resource set being associated with a first control resource set pool index.

At block 1408, the UE receives, in a second control resource set of the at least one bandwidth part, second downlink control information (e.g., DCI 710 in FIG. 7) scheduling the second uplink transmission, the second control resource set being associated with a second control resource set pool index.

At block 1410, the UE determines whether the at least one bandwidth part is configured to support uplink transmissions from a plurality of antenna panels of the user equipment. In some examples, the UE may determine that a bandwidth part is configured for multi-panel uplink transmissions if coresetPoolIndex values for different CORESETs of a BWP are configured with different values (e.g., a value of a first coresetPoolIndex (e.g., 0) associated with a first CORESET is different from a value of a second coresetPoolIndex (e.g., 1) associated with a second CORESET).

At block 1412, the UE determines to apply the first timing advance group identifier (e.g., the associated-tag-value in Table 9) for the first uplink transmission based on the first control resource set pool index and to apply the second timing advance group identifier (e.g., the associated-tag-value in Table 9) for the second uplink transmission based on the second control resource set pool index.

At block 1414, the UE performs a first uplink transmission from a first antenna panel of the plurality of antenna panels based on a first timing advance group identifier of the at least two timing advance group identifiers and a second uplink transmission from a second antenna panel of the plurality of antenna panels based on a second timing advance group identifier of the at least two timing advance group identifiers when the at least one bandwidth part is configured to support the uplink transmissions from the plurality of antenna panels.

FIG. 15 is a flowchart 1500 of a method of wireless communication. The method may be performed by a UE (e.g., the UE 104; the apparatus 1702/1702'; the processing system 1814, which may include the memory 360 and which may be the entire UE 104 or a component of the UE 104, such as the TX processor 368, the RX processor 356, and/or the controller/processor 359). In FIG. 15, blocks with dashed lines (e.g., blocks 1506, 1508) indicate optional blocks.

At block 1502, the UE receives configuration information for a serving cell, the configuration information indicating at least one bandwidth part and at least two timing advance group identifiers for the serving cell.

At block 1504, the UE determines whether the at least one bandwidth part is configured to support uplink transmissions from a plurality of antenna panels of the user equipment.

At block 1506, the UE receives a radio resource control configuration. The radio resource control configuration indicates resources of an uplink channel to be used for the first uplink transmission and the second uplink transmission. The radio resource control configuration further indicates the first timing advance group identifier to be applied to the first uplink transmission and the second timing advance group identifier to be applied to the second uplink transmission.

At block 1508, the UE determines the first timing advance group identifier or the second timing advance group identifier based on a radio resource control configuration if the first uplink transmission or the second uplink transmission is for a periodical transmission, or based on downlink control information triggering the uplink control channel if the first uplink transmission or the second uplink transmission is for an aperiodical transmission.

At block 1510, the UE performs a first uplink transmission from a first antenna panel of the plurality of antenna panels based on a first timing advance group identifier of the at least two timing advance group identifiers and a second uplink transmission from a second antenna panel of the plurality of antenna panels based on a second timing advance group identifier of the at least two timing advance group identifiers when the at least one bandwidth part is configured to support the uplink transmissions from the plurality of antenna panels. For example, the first uplink transmission or the second uplink transmission may be performed on an uplink control channel.

FIG. 16 is a flowchart 1600 of a method of wireless communication. The method may be performed by a UE (e.g., the UE 802; the apparatus 1702/1702'; the processing system 1814, which may include the memory 360 and which may be the entire UE 802 or a component of the UE 802, such as the TX processor 368, the RX processor 356, and/or the controller/processor 359). In FIG. 16, blocks with dashed lines (e.g., blocks 1608, 1610, 1612, 1614) indicate optional blocks.

At block 1602, the UE receives, in a serving cell, a cell-specific timing advance command (e.g., the timing advance command 1104, 1204 in the MAC-CE 1100, 1200) to be applied to a first uplink transmission from a first antenna panel of the user equipment and a second uplink transmission from a second antenna panel of the user equipment.

At block 1604, the UE receives a first panel-specific timing offset (e.g., the timing offset 1114, 1208 in the MAC-CE 1100, 1200) to be applied to the first uplink transmission from the first antenna panel (e.g., panel 0 1821) of the user equipment and a second panel-specific timing offset (e.g., the timing offset 1118, 1212 in the MAC-CE 1100, 1200) to be applied to the second uplink transmission from the second antenna panel (e.g., panel 1 1823) of the user equipment.

At block 1606, the UE performs the first uplink transmission from the first antenna panel based on the cell-specific timing advance command and the first panel-specific timing offset, and performs the second uplink transmission from the second antenna based on the cell-specific timing advance command and the second panel-specific timing offset.

At block 1608, the UE receives a second cell-specific timing advance command.

At block 1610, the UE optionally replaces a first cell-specific timing offset included in the cell-specific timing advance command with a second cell-specific timing offset included in the second cell-specific timing advance command.

At block 1612, the UE optionally maintains the first panel-specific timing offset and the second panel-specific timing offset.

At block 1614, the UE optionally resets the first panel-specific timing offset and the second panel-specific timing offset.

Figure 17:
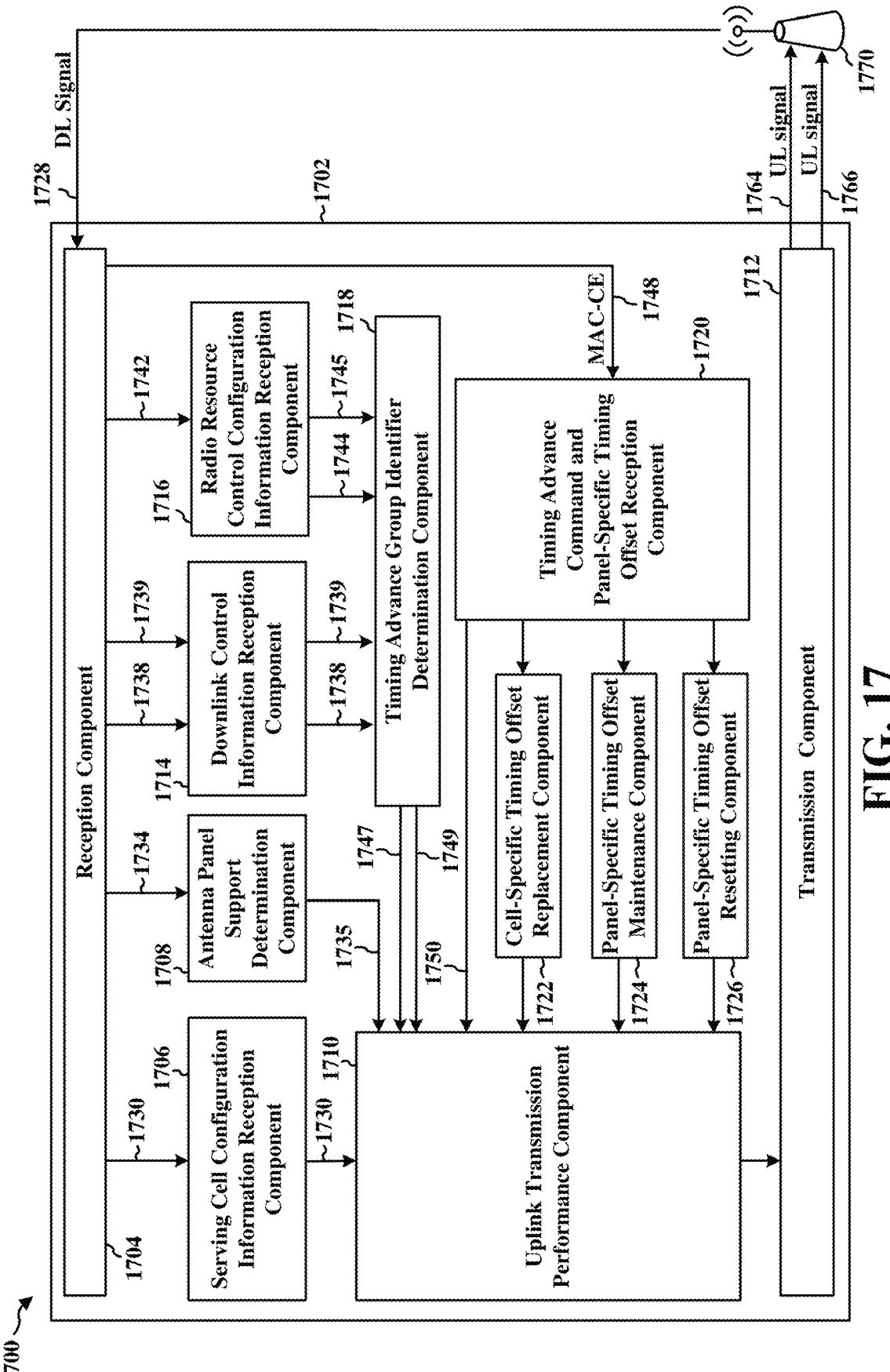
FIG. 17 is a conceptual data flow diagram illustrating the data flow between different means/components in an example apparatus.

FIG. 17 is a conceptual data flow diagram 1700 illustrating the data flow between different means/components in an example apparatus 1702. The apparatus may be a UE. The apparatus includes a reception component 1704 that receives downlink transmissions (e.g., DL signal 1728) from a base station (e.g., base station 1770). The apparatus further includes a serving cell configuration information reception component 1706 that receives configuration information 1730 for a serving cell (e.g., configuration information indicating at least one bandwidth part and at least two timing advance group identifiers for the serving cell). The serving cell configuration information reception component 1706 further receives at least one control resource set configuration for a control channel in the at least one bandwidth part, the at least one control resource set configuration indicating a control resource set pool index and a timing advance group identifier of the at least two timing advance group identifiers associated with the control resource set pool index.

The apparatus further includes an antenna panel support determination component 1708 that determines (e.g., based on coresetPoolIndex values 1734) whether the at least one bandwidth part is configured to support uplink transmissions from a plurality of antenna panels of the user equipment. The determination 1735 may be provided to the uplink transmission performance component 1710.

The apparatus further includes an uplink transmission performance component 1710 that performs (e.g., via the transmission component 1712) a first uplink transmission from a first antenna panel of the plurality of antenna panels based on a first timing advance group identifier of the at least two timing advance group identifiers and a second uplink transmission from a second antenna panel of the plurality of antenna panels based on a second timing advance group identifier of the at least two timing advance group identifiers when the at least one bandwidth part is configured to support the uplink transmissions from the plurality of antenna panels. The uplink transmission performance component 1710 further performs a third uplink transmission based on a default timing advance group identifier when the at least one bandwidth part is not configured to support the uplink transmissions from the plurality of antenna panels, wherein the default timing advance group identifier is one of the at least two timing advance group identifiers for the serving cell. The uplink transmission performance component 1710 further performs a first uplink transmission from the first antenna panel based on a cell-specific timing advance command and a first panel-specific timing offset, and performs a second uplink transmission from the second antenna based on the cell-specific timing advance command and the second panel-specific timing offset.

The apparatus further includes a transmission component 1712 that transmits uplink transmissions (e.g., a first UL signal 1764 and a second UL signal 1766) to a base station (e.g., the base station 1770). For example, the transmission component 1712 may transmit the first UL signal 1764 from a first antenna panel (e.g., panel 0 1821 of the multi-panel antenna 1820 in FIG. 18) and may transmit the second UL signal 1766 from a second antenna panel (e.g., panel 1 1823 of the multi-panel antenna 1820 in FIG. 18).

The apparatus further includes a downlink control information reception component 1714 that receives, in a first control resource set of the at least one bandwidth part, first downlink control information 1738 scheduling the first uplink transmission (e.g., the first UL signal 1764), the first control resource set being associated with a first control resource set pool index. The downlink control information reception component 1714 further receives, in a second control resource set of the at least one bandwidth part, second downlink control information 1739 scheduling the second uplink transmission (e.g., the second UL signal 1766), the second control resource set being associated with a second control resource set pool index.

The apparatus further includes a radio resource control configuration information reception component 1716 that receives a radio resource control configuration 1742 indicating resources of an uplink channel to be used for the first uplink transmission and the second uplink transmission, and the first timing advance group identifier 1744 to be applied to the first uplink transmission and the second timing advance group identifier 1745 to be applied to the second uplink transmission.

The apparatus further includes a timing advance group identifier determination component 1718 that determines to apply the first timing advance group identifier 1747 for the first uplink transmission based on the first control resource set pool index and to apply the second timing advance group identifier 1749 for the second uplink transmission based on the second control resource set pool index. For example, the first uplink transmission or the second uplink transmission may be performed on an uplink control channel.

The apparatus further includes a timing advance command (e.g., a cell-specific timing advance command) and panel-specific timing offset reception component 1720 that receives, in a serving cell, a cell-specific timing advance command (e.g., MAC-CE 1748) to be applied to a first uplink transmission from a first antenna panel of the user equipment and a second uplink transmission from a second antenna panel of the user equipment. The timing advance command and panel-specific timing offset reception component 1720 further receives a first panel-specific timing offset (e.g., MAC-CE 1748) to be applied to the first uplink transmission from the first antenna panel of the user equipment and a second panel-specific timing offset (e.g., MAC-CE 1748) to be applied to the second uplink transmission from the second antenna panel of the user equipment. For example, the MAC-CE 1748 may include the MAC-CE 1100 in FIG. 11 or the MAC-CE 1200 in FIG. 12. In some examples, the first panel-specific timing offset is different from the second panel-specific timing offset. The timing advance command and panel-specific timing offset reception component 1720 may provide the timing advance command, the first panel-specific timing offset, and/or the second panel-specific timing offset to the uplink transmission performance component 1710 via the message 1750.

In some aspects, the cell-specific timing advance command, the first panel-specific timing offset, and the second panel-specific timing offset are received in a medium access control (MAC) control element (MAC-CE). In some aspects, the medium access control (MAC) control element (MAC-CE) includes a first control resource set pool index associated with the first panel-specific timing offset and a second control resource set pool index associated with the second panel-specific timing offset, and wherein the first control resource set pool index is associated with the first antenna panel and the second control resource set pool index is associated with the second antenna panel. The timing advance command and panel-specific timing offset reception component 1720 further receives a second cell-specific timing advance command.

The apparatus further includes a cell-specific timing offset replacement component 1722 that replaces a first cell-specific timing offset included in the cell-specific timing advance command with a second cell-specific timing offset included in the second cell-specific timing advance command.

The apparatus further includes a panel-specific timing offset maintenance component 1724 that maintains the first panel-specific timing offset and the second panel-specific timing offset.

The apparatus further includes a panel-specific timing offset resetting component 1726 that resets the first panel-specific timing offset and the second panel-specific timing offset.

The apparatus may include additional components that perform each of the blocks of the algorithm in the aforementioned flowcharts of FIGS. 13-16. As such, each block in the aforementioned flowcharts of FIGS. 13-16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
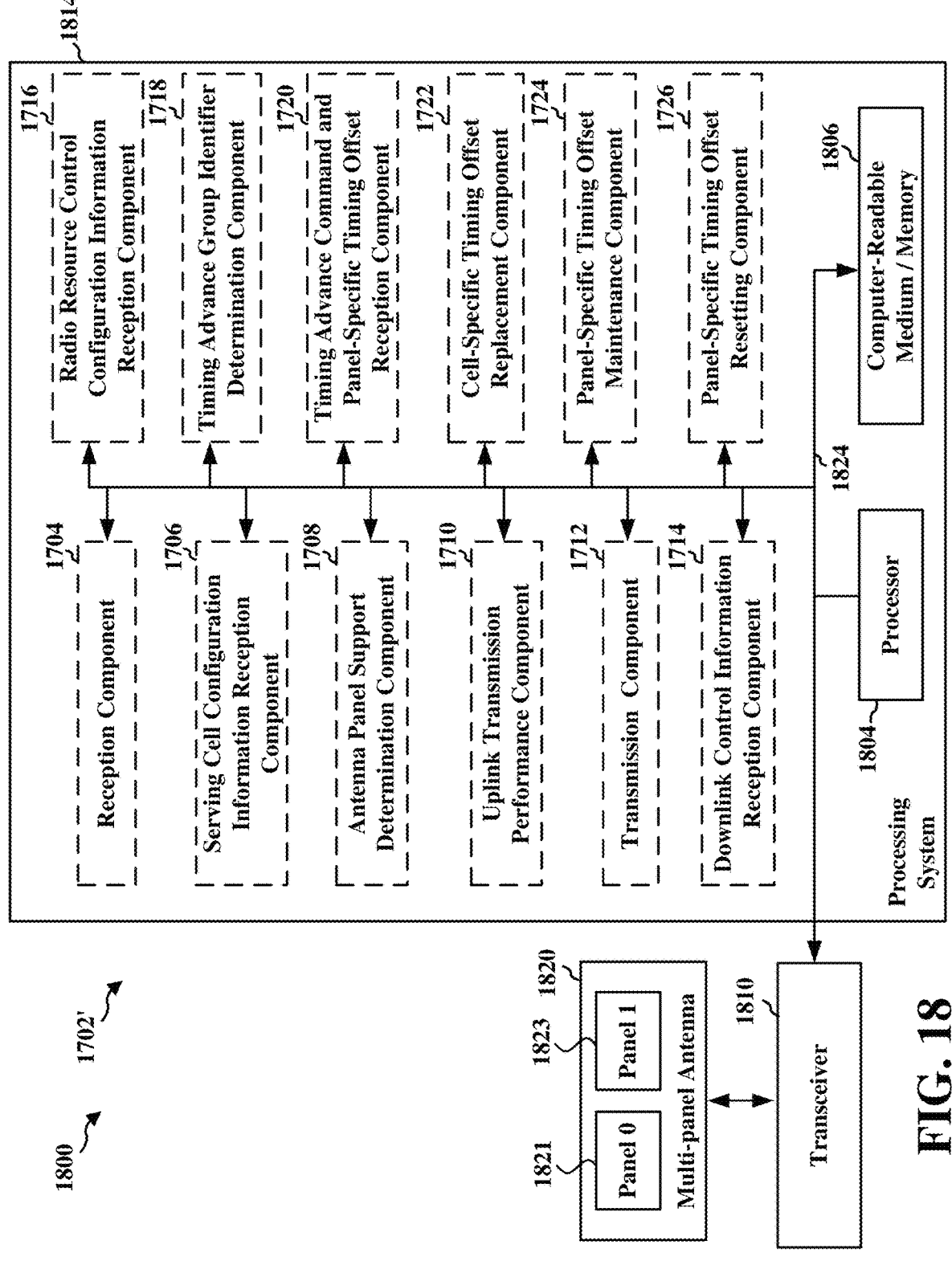
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1712, 1714, 1716, 1718, 1720, 1722, 1724, 1726 and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1712, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, 1712, 1714, 1716, 1718, 1720, 1722, 1724, 1726. The components may be software components running in the processor 1804, resident/stored in the computer readable medium/memory 1806, one or more hardware components coupled to the processor 1804, or some combination thereof. The processing system 1814 may be a component of the UE 350 and may include the memory 360 and/or at least one of the TX processor 368, the RX processor 356, and the controller/processor 359. Alternatively, the processing system 1814 may be the entire UE (e.g., see 350 of FIG. 3).

In one configuration, the apparatus 1702/1702' for wireless communication includes means for means for receiving configuration information for a serving cell, the configuration information indicating at least one bandwidth part and at least two timing advance group identifiers for the serving cell, means for determining whether the at least one bandwidth part is configured to support uplink transmissions from a plurality of antenna panels of the apparatus, means for performing a first uplink transmission from a first antenna panel of the plurality of antenna panels based on a first timing advance group identifier of the at least two timing advance group identifiers and a second uplink transmission from a second antenna panel of the plurality of antenna panels based on a second timing advance group identifier of the at least two timing advance group identifiers when the at least one bandwidth part is configured to support the uplink transmissions from the plurality of antenna panels, means for performing a third uplink transmission based on a default timing advance group identifier when the at least one bandwidth part is not configured to support the uplink transmissions from the plurality of antenna panels, wherein the default timing advance group identifier is one of the at least two timing advance group identifiers for the serving cell, means for receiving at least one control resource set configuration for a control channel in the at least one bandwidth part, the at least one control resource set configuration indicating a control resource set pool index and a timing advance group identifier of the at least two timing advance group identifiers associated with the control resource set pool index, means for receiving, in a first control resource set of the at least one bandwidth part, first downlink control information scheduling the first uplink transmission, the first control resource set being associated with a first control resource set pool index, means for receiving, in a second control resource set of the at least one bandwidth part, second downlink control information scheduling the second uplink transmission, the second control resource set being associated with a second control resource set pool index, means for determining to apply the first timing advance group identifier for the first uplink transmission based on the first control resource set pool index and to apply the second timing advance group identifier for the second uplink transmission based on the second control resource set pool index, means for receiving a radio resource control configuration indicating resources of an uplink channel to be used for the first uplink transmission and the second uplink transmission, and the first timing advance group identifier to be applied to the first uplink transmission and the second timing advance group identifier to be applied to the second uplink transmission, means for determining the first timing advance group identifier or the second timing advance group identifier based on a radio resource control configuration if the first uplink transmission or the second uplink transmission is for a periodical transmission, or based on downlink control information triggering the uplink control channel if the first uplink transmission or the second uplink transmission is for an aperiodical transmission, means for receiving, in a serving cell, a cell-specific timing advance command to be applied to a first uplink transmission from a first antenna panel of the apparatus and a second uplink transmission from a second antenna panel of the apparatus, means for receiving a first panel-specific timing offset to be applied to the first uplink transmission from the first antenna panel of the apparatus and a second panel-specific timing offset to be applied to the second uplink transmission from the second antenna panel of the apparatus, means for performing the first uplink transmission from the first antenna panel based on the cell-specific timing advance command and the first panel-specific timing offset, and performing the second uplink transmission from the second antenna panel based on the cell-specific timing advance command and the second panel-specific timing offset, means for receiving a second cell-specific timing advance command, means for replacing a first cell-specific timing offset included in the cell-specific timing advance command with a second cell-specific timing offset included in the second cell-specific timing advance command, means for maintaining the first panel-specific timing offset and the second panel-specific timing offset, means for receiving a second cell-specific timing advance command, means for replacing a first cell-specific timing offset included in the cell-specific timing advance command with a second cell-specific timing offset included in the second cell-specific timing advance command, means for resetting the first panel-specific timing offset and the second panel-specific timing offset.

The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication for a user equipment, comprising:
receiving configuration information for a serving cell, the configuration information indicating at least one bandwidth part and at least two timing advance group identifiers for the serving cell;
determining whether the at least one bandwidth part is configured to support uplink transmissions from a plurality of antenna panels of the user equipment;
responsive to the user equipment being configured to transmit one or more uplink transmissions based on downlink control information scheduling the one or more uplink transmissions:
receiving, in a first control resource set of the at least one bandwidth part, first downlink control information scheduling a first uplink transmission, the first control resource set being associated with a first control resource set pool index; and
determining to apply a first timing advance group identifier of the at least two timing advance group identifiers for the first uplink transmission based on the first control resource set pool index; and
performing the first uplink transmission from a first antenna panel of the plurality of antenna panels based on the first timing advance group identifier of the at least two timing advance group identifiers and a second uplink transmission from a second antenna panel of the plurality of antenna panels based on a second timing advance group identifier of the at least two timing advance group identifiers when the at least one bandwidth part is configured to support the uplink transmissions from the plurality of antenna panels.

2. The method of claim 1, further comprising:
performing a third uplink transmission based on a default timing advance group identifier when the at least one bandwidth part is not configured to support the uplink transmissions from the plurality of antenna panels, wherein the default timing advance group identifier is one of the at least two timing advance group identifiers for the serving cell.

3. The method of claim 1, further comprising:
receiving at least one control resource set configuration for a control channel in the at least one bandwidth part, the at least one control resource set configuration indicating a control resource set pool index and a timing advance group identifier of the at least two timing advance group identifiers associated with the control resource set pool index.

4. The method of claim 1, further comprising:
responsive to the user equipment being configured to transmit the one or more uplink transmissions based on the downlink control information scheduling the one or more uplink transmissions:
receiving, in a second control resource set of the at least one bandwidth part, second downlink control information scheduling the second uplink transmission, the second control resource set being associated with a second control resource set pool index; and
determining to apply the second timing advance group identifier for the second uplink transmission based on the second control resource set pool index.

5. The method of claim 1, wherein responsive to the user equipment being configured to transmit the one or more uplink transmissions independent of the downlink control information scheduling the one or more uplink transmissions, the first uplink transmission and the second uplink transmission are performed using resources of an uplink channel indicated in a radio resource control configuration, and wherein the first timing advance group identifier to be applied to the first uplink transmission is based on the first control resource set pool index of the first control resource set that includes first activation downlink control information for the uplink channel; and the second timing advance group identifier to be applied to the second uplink transmission is based on a second control resource set pool index of a second control resource set that includes second activation downlink control information for the uplink channel.

6. The method of claim 1, further comprising:

responsive to the user equipment being configured to transmit the one or more uplink transmissions independent of the downlink control information scheduling the one or more uplink transmissions, receiving a radio resource control configuration indicating resources of an uplink channel to be used for the first uplink transmission and the second uplink transmission, and the first timing advance group identifier to be applied to the first uplink transmission and the second timing advance group identifier to be applied to the second uplink transmission.

7. The method of claim 1, wherein responsive to the user equipment being configured to transmit the one or more uplink transmissions independent of the downlink control information scheduling the one or more uplink transmissions, the first uplink transmission or the second uplink transmission is performed on an uplink control channel, further comprising:

determining the first timing advance group identifier or the second timing advance group identifier based on a radio resource control configuration if the first uplink transmission or the second uplink transmission is for a periodical transmission, or based on downlink control information triggering the uplink control channel if the first uplink transmission or the second uplink transmission is for an aperiodical transmission.

8. The method of claim 1, wherein at least one of the first timing advance group identifier and the second timing advance group identifier is a default timing advance group identifier when no timing advance group identifier is indicated for the at least one bandwidth part.

9. An apparatus for wireless communication, comprising:

a memory; and at least one processor coupled to the memory and configured to:

receive configuration information for a serving cell, the configuration information indicating at least one bandwidth part and at least two timing advance group identifiers for the serving cell;

determine whether the at least one bandwidth part is configured to support uplink transmissions from a plurality of antenna panels of the apparatus;

responsive to the apparatus being configured to transmit one or more uplink transmissions based on downlink control information scheduling the one or more uplink transmissions:

receive, in a first control resource set of the at least one bandwidth part, first downlink control information scheduling a first uplink transmission, the first control resource set being associated with a first control resource set pool index; and determine to apply a first timing advance group identifier of the at least two timing advance group identifiers for the first uplink transmission based on the first control resource set pool index; and perform the first uplink transmission from a first antenna panel of the plurality of antenna panels based on the first timing advance group identifier of the at least two timing advance group identifiers and a second uplink transmission from a second antenna panel of the plurality of antenna panels based on a second timing advance group identifier of the at least two timing advance group identifiers when the at least one bandwidth part is configured to support the uplink transmissions from the plurality of antenna panels.

10. The apparatus of claim 9, wherein the at least one processor is further configured to:

perform a third uplink transmission based on a default timing advance group identifier when the at least one bandwidth part is not configured to support the uplink transmissions from the plurality of antenna panels, wherein the default timing advance group identifier is one of the at least two timing advance group identifiers for the serving cell.

11. The apparatus of claim 9, wherein the at least one processor is further configured to:

receive at least one control resource set configuration for a control channel in the at least one bandwidth part, the at least one control resource set configuration indicating a control resource set pool index and a timing advance group identifier of the at least two timing advance group identifiers associated with the control resource set pool index.

12. The apparatus of claim 9, wherein the at least one processor is further configured to:

responsive to the apparatus being configured to transmit the one or more uplink transmissions based on the downlink control information scheduling the one or more uplink transmissions:

receive, in a second control resource set of the at least one bandwidth part, second downlink control information scheduling the second uplink transmission, the second control resource set being associated with a second control resource set pool index; and determine to apply the second timing advance group identifier for the second uplink transmission based on the second control resource set pool index.

13. The apparatus of claim 9, wherein responsive to the apparatus being configured to transmit the one or more uplink transmissions independent of the downlink control information scheduling the one or more uplink transmissions, the first uplink transmission and the second uplink transmission are performed using resources of an uplink channel indicated in a radio resource control configuration, and wherein the first timing advance group identifier to be applied to the first uplink transmission is based on the first control resource set pool index of the first control resource set that includes first activation downlink control information for the uplink channel; and the second timing advance group identifier to be applied to the second uplink transmission is based on a second control resource set pool index of a second control resource set that includes second activation downlink control information for the uplink channel.

14. The apparatus of claim 9, wherein the at least one processor is further configured to:

responsive to the apparatus being configured to transmit the one or more uplink transmissions independent of the downlink control information scheduling the one or more uplink transmissions, receive a radio resource control configuration indicating resources of an uplink channel to be used for the first uplink transmission and the second uplink transmission, and the first timing advance group identifier to be applied to the first uplink transmission and the second timing advance group identifier to be applied to the second uplink transmission.

15. The apparatus of claim 9, wherein responsive to the apparatus being configured to transmit the one or more uplink transmissions independent of the downlink control information scheduling the one or more uplink transmissions, the first uplink transmission or the second uplink transmission is performed on an uplink control channel, wherein the at least one processor is further configured to:

determine the first timing advance group identifier or the second timing advance group identifier based on a radio resource control configuration if the first uplink transmission or the second uplink transmission is for a periodical transmission, or based on downlink control information triggering the uplink control channel if the first uplink transmission or the second uplink transmission is for an aperiodical transmission.

16. The apparatus of claim 9, wherein at least one of the first timing advance group identifier and the second timing advance group identifier is a default timing advance group identifier when no timing advance group identifier is indicated for the at least one bandwidth part.

17. An apparatus for wireless communication, comprising:

means for receiving configuration information for a serving cell, the configuration information indicating at least one bandwidth part and at least two timing advance group identifiers for the serving cell;

means for determining whether the at least one bandwidth part is configured to support uplink transmissions from a plurality of antenna panels of the apparatus;

responsive to the apparatus being configured to transmit one or more uplink transmissions based on downlink control information scheduling the one or more uplink transmissions:

means for receiving, in a first control resource set of the at least one bandwidth part, first downlink control information scheduling a first uplink transmission, the first control resource set being associated with a first control resource set pool index; and means for determining to apply a first timing advance group identifier of the at least two timing advance group identifiers for the first uplink transmission based on the first control resource set pool index; and means for performing the first uplink transmission from a first antenna panel of the plurality of antenna panels based on the first timing advance group identifier of the at least two timing advance group identifiers and a second uplink transmission from a second antenna panel of the plurality of antenna panels based on a second timing advance group identifier of the at least two timing advance group identifiers when the at least one bandwidth part is configured to support the uplink transmissions from the plurality of antenna panels.

18. The apparatus of claim 17, further comprising:

means for performing a third uplink transmission based on a default timing advance group identifier when the at least one bandwidth part is not configured to support the uplink transmissions from the plurality of antenna panels, wherein the default timing advance group identifier is one of the at least two timing advance group identifiers for the serving cell.

19. The apparatus of claim 17, further comprising:

means for receiving at least one control resource set configuration for a control channel in the at least one bandwidth part, the at least one control resource set configuration indicating a control resource set pool index and a timing advance group identifier of the at least two timing advance group identifiers associated with the control resource set pool index.

20. The apparatus of claim 17, further comprising:

responsive to the apparatus being configured to transmit the one or more uplink transmissions based on the downlink control information scheduling the one or more uplink transmissions:

means for receiving, in a second control resource set of the at least one bandwidth part, second downlink control information scheduling the second uplink transmission, the second control resource set being associated with a second control resource set pool index; and means for determining to apply the second timing advance group identifier for the second uplink transmission based on the second control resource set pool index.

21. The apparatus of claim 17, wherein responsive to the apparatus being configured to transmit the one or more uplink transmissions independent of the downlink control information scheduling the one or more uplink transmissions, the first uplink transmission and the second uplink transmission are performed using resources of an uplink channel indicated in a radio resource control configuration, and wherein the first timing advance group identifier to be applied to the first uplink transmission is based on the first control resource set pool index of the first control resource set that includes first activation downlink control information for the uplink channel; and the second timing advance group identifier to be applied to the second uplink transmission is based on a second control resource set pool index of a second control resource set that includes second activation downlink control information for the uplink channel.

22. The apparatus of claim 17, further comprising:

responsive to the apparatus being configured to transmit the one or more uplink transmissions independent of the downlink control information scheduling the one or more uplink transmissions, means for receiving a radio resource control configuration indicating resources of an uplink channel to be used for the first uplink transmission and the second uplink transmission, and the first timing advance group identifier to be applied to the first uplink transmission and the second timing advance group identifier to be applied to the second uplink transmission.

23. The apparatus of claim 17, wherein responsive to the apparatus being configured to transmit the one or more uplink transmissions independent of the downlink control information scheduling the one or more uplink transmissions, the first uplink transmission or the second uplink transmission is performed on an uplink control channel, further comprising:

means for determining the first timing advance group identifier or the second timing advance group identifier based on a radio resource control configuration if the first uplink transmission or the second uplink transmission is for a periodical transmission, or based on downlink control information triggering the uplink control channel if the first uplink transmission or the second uplink transmission is for an aperiodical transmission.

\* \* \* \* \*